US006791330B2

(12) United States Patent
McCormick

(10) Patent No.: US 6,791,330 B2
(45) Date of Patent: Sep. 14, 2004

(54) WELL LOGGING TOOL AND METHOD FOR DETERMINING RESISTIVITY BY USING PHASE DIFFERENCE AND/OR ATTENUATION MEASUREMENTS

(75) Inventor: Dan Jay McCormick, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/195,319

(22) Filed: Jul. 16, 2002

(65) Prior Publication Data

US 2004/0012392 A1 Jan. 22, 2004

(51) Int. Cl.[7] .............................................. G01V 3/30
(52) U.S. Cl. ...................................................... 324/338
(58) Field of Search ................................. 324/338, 339

(56) References Cited

U.S. PATENT DOCUMENTS

| | | | |
|---|---|---|---|
| 2,754,475 A | 7/1956 | Norelius | |
| 2,790,138 A | 4/1957 | Poupon | |
| 2,997,645 A | 8/1961 | Huddleston, Jr. et al. | |
| 3,305,771 A | 2/1967 | Arps | |
| 3,551,797 A | 12/1970 | Gouilloud et al. | |
| 3,849,721 A | 11/1974 | Calvert | |
| 3,891,916 A | 6/1975 | Meador et al. | |
| 3,993,944 A | 11/1976 | Meador et al. | |
| 4,107,597 A | 8/1978 | Meador et al. | |
| 4,185,238 A | 1/1980 | Huchital et al. | |
| 4,209,747 A | 6/1980 | Huchital | |
| 4,278,941 A | 7/1981 | Freedman | |
| 4,300,098 A | 11/1981 | Huchital et al. | |
| 4,451,789 A | 5/1984 | Meador | |
| 4,461,997 A | 7/1984 | Ohmer | |
| 4,483,393 A | 11/1984 | More et al. | |
| 4,502,121 A | 2/1985 | Clavier et al. | |
| 4,511,842 A | 4/1985 | Moran et al. | |
| 4,511,843 A | 4/1985 | Thoraval | |
| 4,536,714 A | 8/1985 | Clark | |
| 4,538,109 A | 8/1985 | Clark | |

(List continued on next page.)

FOREIGN PATENT DOCUMENTS

| | | |
|---|---|---|
| CA | 1040261 | 10/1978 |
| GB | 2146126 | 4/1985 |
| GB | 2156527 | 10/1985 |

OTHER PUBLICATIONS

Franz, "Downhole Recording System for MWD", SPE 10054, Oct., 1981.

(List continued on next page.)

*Primary Examiner*—N. Le
*Assistant Examiner*—Reena Aurora
(74) *Attorney, Agent, or Firm*—Nixon & Vanderhye P.C.

(57) ABSTRACT

An apparatus and method for determining resistivity of a formation surrounding a borehole comprises a housing, at least first and second transmitting antennas affixed to the housing for transmitting electromagnetic waves to the formation, and at least first and second receiving antennas for detecting the electromagnetic waves. The first receiving antenna is affixed to the housing at a position longitudinally located above the first and second transmitting antennas, and the second receiving antenna is longitudinally located below the first and second transmitting antennas. The measurements needed to calculate the resistivity of the formation may be determined while drilling the borehole.

48 Claims, 20 Drawing Sheets

U.S. PATENT DOCUMENTS

| | | | |
|---|---|---|---|
| 4,553,097 | A | 11/1985 | Clark |
| 4,584,675 | A | 4/1986 | Peppers |
| 4,601,100 | A | 7/1986 | More et al. |
| 4,609,873 | A | 9/1986 | Cox et al. |
| 4,622,518 | A | 11/1986 | Cox et al. |
| 4,626,785 | A | 12/1986 | Hagiwara |
| 4,651,101 | A | 3/1987 | Barber et al. |
| 4,651,121 | A | 3/1987 | Barber et al. |
| 4,652,828 | A | 3/1987 | Kenyon et al. |
| 4,652,829 | A | 3/1987 | Safinya |
| 4,684,946 | A | 8/1987 | Issenmann |
| 4,692,706 | A | 9/1987 | Mazzagatti et al. |
| 4,700,141 | A | 10/1987 | Cox et al. |
| 4,730,161 | A | 3/1988 | Cox et al. |
| 4,748,415 | A | 5/1988 | Vail, III |
| 4,800,385 | A | 1/1989 | Yamazaki |
| 4,810,970 | A | 3/1989 | Warren et al. |
| 4,873,488 | A | 10/1989 | Barber et al. |
| 4,899,112 | A | 2/1990 | Clark et al. |
| 4,949,045 | A | 8/1990 | Clark et al. |
| 4,968,940 | A | 11/1990 | Clark et al. |
| 4,972,149 | A | 11/1990 | Cox et al. |
| 5,402,068 | A | 3/1995 | Meador et al. |
| 5,574,374 | A | 11/1996 | Thompson et al. |
| 5,869,968 | A * | 2/1999 | Brooks et al. ............... 324/338 |
| 6,064,210 | A | 5/2000 | Sinclair |
| 6,218,842 | B1 * | 4/2001 | Bittar et al. ................. 324/339 |
| 6,377,050 | B1 * | 4/2002 | Chemali et al. ............. 324/338 |

OTHER PUBLICATIONS

Rodney et al., "The Electromagnetic Wave Resistivity MWD Tool", SPE 12167, Oct., 1983.

Coope et al., "Formation Evaluation Using Measurements Recorded While Drilling", SPWLA Twenty–Fifth Annual Logging Symposium, Jun., 1984.

Coope et al., "The Theory of 2 MHz Resistivity Tool And Its Application To Measurement–While–Drilling", The Log Analyst, May–Jun., 1984.

Hendricks et al., "MWD: Formation Evaluation Case Histories In The Gulf of Mexico", SPE 13187, Sep., 1984.

Holbrook, "The Effect of Mud Filtrate Invasion On The EWR Log–A Case History", SPWLA Twenty–Sixth Annual Logging Symposium, Jun., 1984.

Coope et al., "Formation Evaluation Using EWR Logs", SPE 14062, Mar., 1986.

Rodney et al., "Electromagnetic Wave Resistivity MWD Tool", SPE Drilling Engineering, Oct., 1986.

Grief et al., "Petrophysical Evaluation of Thinly Bedded Reservoirs in High Angle/Displacement Development Wells With The NL Recorded Lithology Logging System", The Log Analyst, Sep.–Oct., 1986.

Gianzero et al., "A New Resistivity Tool for Measurement–While–Drilling", SPWLA Twenty–Sixth Annual Logging Symposium, Jun., 1985.

Gianzero et al., "Determining the Invasion Near the Bit With The M.W.D. Toroid Sonde", SPWLA Twenty–Seventh Annual Logging Symposium, Jun., 1986.

Chin et al., "Formation Evaluation Using Repeated MWD Logging Measurements", SPWLA 27th Annual Logging Symposium, Houston, Tex., Jun. 9–13, 1986.

Coope et al., "Evaluation of Thin Beds and Low Resistivity Pays Using EWR Logs", Transactions of the Tenth European Formation Evaluation Symposium, Aberdeen, Scotland, Apr. 22, 1986.

"Drillcom", Literature: RLL Recorded Lithology Logging System, Measurements While Drilling Technical Specifications, 1985.

Elliott et al., "Recording Downhole Formation Data While Drilling", Journal of Petroleum Technology, Jul. 1985.

Koopersmith et al., "Environmental Parameters Affecting Neutron Porosity, Gamma Ray, and Resistivity Measurements Made While Drilling", Society of Petroleum Engineers Pulbication SPE 16758, Sep. 27–30, 1987.

Huchital et al., "The Deep Propagation Tool, Society of Petroleum Engineers", SPE 10988, 1981.

Besson et al., "Environmental Effects on Deep Electromagnetic Logging Tools", SPWLA, Jun., 1986.

Blenkinsop et al., "Deep Electromagnetic Propagation Tool Interpretation", SPWLA, Jun., 1986.

Log Interpretation Principles/Applications, pp. 132, 133, 137, Oct. 1987.

* cited by examiner

WELL LOGGING TOOL AND METHOD FOR DETERMINING RESISTIVITY BY USING PHASE DIFFERENCE AND/OR ATTENUATION MEASUREMENTS

BACKGROUND OF THE INVENTION

The present invention relates to a method and apparatus for well logging and particularly to a compensated measuring while drilling (MWD) well logging method and apparatus in which at least one receiving antenna is longitudinally positioned above at least one pair of transmitting antennas and at least one other receiving antenna is longitudinally positioned below the at least one pair of transmitting antennas.

A measurement of resistivity (or conductivity) is often performed as part of an investigation of formations surrounding a borehole. In particular, measuring the resistivity may be valuable in determining whether a particular formation surrounding the borehole contains hydrocarbons since it is known for example that a formation containing hydrocarbons typically has a higher resistivity than a formation containing salt water.

One class of devices for investigating formations surrounding a borehole determines formation resistivity by transmitting and receiving electromagnetic wave signals through the formation. In particular, one of such devices involves transmitting an electromagnetic wave from a single transmitting antenna through the formation and receiving the electromagnetic wave using receiving antennas located at respective distances from the transmitting antenna.

However, phase shift and amplitude ratio errors may be introduced by very slight physical changes in the receiver antennas induced by changes in pressure and temperature. Other errors may be introduced if signals are received by different receiving antennas and/or processed by different receiver electronics. For example, two separate receivers which are intended to perform identically may induce errors in measurements due to differences therebetween. U.S. Pat. No. 5,402,068 issued Mar. 28, 1995 discusses upper and lower transmitting antennas being energized successively via separate and dedicated driver circuits proximate each transmitter. Measurements from the transmitting antennas can be combined to eliminate cancellation system error components. Amplitude effecting error components and phase effecting error components may be eliminated.

Another of such devices is capable of providing compensated resistivity measurements by arranging a pair receiving antennas between upper and lower transmitting antennas. However, this type of device often requires two transmitters (i.e., two transmitter electronics units), one connected to the upper transmitting antenna and the other connected to the lower transmitting antenna. Moreover, this type of device often further requires wires that respectively connect an energizing source with each of the transmitters. Since the wires often pass a nearby receiving antenna, noise may be detected by the receiving antenna as a result of the crosstalk from the wire(s).

There thus remains a need in the art for a well logging device and technique which remedy the above drawbacks. For example, it would be beneficial to provide a well logging device which minimizes errors caused by any possible crosstalk or any other source, improves accuracy of measurements, provides improved quality of logs by increasing frequency, and reduces overall power requirements.

U.S. Pat. No. 4,899,122 issued Feb. 6, 1990, U.S. Pat. No. 4,949,045 issued Aug. 14, 1990, and U.S. Pat. No. 4,968,940 issued Nov. 6, 1990 illustrate well logging devices which investigate formations surrounding a borehole and in particular well logging devices which include a pair of receiving antennas arranged between upper and lower transmitting antennas.

BRIEF DESCRIPTION OF THE INVENTION

In an exemplary embodiment of the present invention, an apparatus and method for determining resistivity of a formation surrounding a borehole comprises a housing having a longitudinal axis; first and second transmitting antennas affixed to the housing for transmitting electromagnetic waves to the formation; a first receiving antenna for detecting the electromagnetic waves, the first receiving antenna being affixed to the housing at a position along the longitudinal axis of the housing above the first and second transmitting antennas; a second receiving antenna for detecting the electromagnetic waves, the second receiving antenna being affixed to the housing at a position along the longitudinal axis of the housing below the first and second transmitting antennas; and a processor operatively coupled to the first and second receiving antennas for determining the resistivity of the formation based on the electromagnetic waves detected by the first and second receiving antennas.

A drill bit may be arranged proximately to one end of the housing. The processor may determine the resistivity of the formation by determining at least one of a phase shift and an amplitude ratio between the electromagnetic waves detected by the first receiving antenna and determining at least one of a phase shift and an amplitude ratio between the electromagnetic waves detected by the second receiving antenna.

The first and second transmitting antennas may be alternately connected to a transmitter which energizes the transmitting antenna to which it is connected with a signal having one of a plurality of available frequencies. Alternatively, the first and second transmitting antennas may be alternately connected to a transmitter which energizes the one of the first and second transmitting antennas to which it is connected with a signal that simultaneously includes a plurality of frequency components. As another alternative, the first and second transmitting antennas may be respectively connected to first and second transmitters so that electromagnetic waves are simultaneously transmitted by the first and second transmitting antennas with different frequencies.

In another exemplary embodiment of the present invention, an apparatus and method for determining resistivity of a formation surrounding a borehole comprises: a housing having a longitudinal axis; first and second transmitting antennas affixed to the housing for respectively transmitting first and second electromagnetic waves through the formation; a first receiving antenna for detecting the first and second electromagnetic waves transmitted through the formation, the first receiving antenna being affixed to the housing at a position along the longitudinal axis of the housing above the first and second transmitting antennas; a second receiving antenna for detecting the first and second electromagnetic waves transmitted through the formation, the second receiving antenna being affixed to the housing at a position along the longitudinal axis of the housing below the first and second transmitting antennas; a third receiving antenna for detecting the first and second electromagnetic waves transmitted through the formation, the third receiving antenna being affixed to the housing at a position along the longitudinal axis of the housing above the first and second transmitting antennas; a fourth receiving antenna for detecting the first and second electromagnetic waves transmitted through the formation, the fourth receiving antenna being affixed to the housing at a position along the longitudinal axis of the housing below the first and second transmitting antennas; and a processor operatively coupled to the first, second, third and fourth receiving antennas for determining the resistivity of the formation based on electromagnetic waves detected by at least two of the first, second, third and fourth receiving antennas.

In another exemplary embodiment of the invention, an apparatus and method for determining resistivity of a formation surrounding a borehole comprises: a housing having a longitudinal axis; a first transmitting antenna affixed to the housing for transmitting a first electromagnetic wave through the formation; a second transmitting antenna affixed to the housing for transmitting a second electromagnetic wave through the formation; a third transmitting antenna affixed to the housing for transmitting a third electromagnetic wave through the formation; a fourth transmitting antenna affixed to the housing for transmitting a fourth electromagnetic wave through the formation, each of the first, second, third and fourth transmitting antennas having a different longitudinal position along the longitudinal axis of the housing; a first receiving antenna for detecting the first, second, third and fourth electromagnetic waves, the first receiving antenna being affixed to the housing at a position along the longitudinal axis of the housing above the first, second, third and fourth transmitting antennas; a second receiving antenna for detecting first, second, third and fourth electromagnetic waves, the second receiving antenna being affixed to the housing at a position along the longitudinal axis of the housing below the first, second, third and fourth transmitting antennas; and a processor operatively coupled to the first and second receiving antennas for determining the resistivity of the formation based on at least two of the electromagnetic waves detected by the first and second receiving antennas.

BRIEF DESCRIPTION OF THE DRAWINGS

These, as well as other advantages of this invention, will be more completely understood and appreciated by careful study of the following more detailed description of the exemplary embodiments of the invention taken in conjunction with the accompanying drawings, in which.

DETAILED DESCRIPTION OF THE INVENTION

Figure 1:
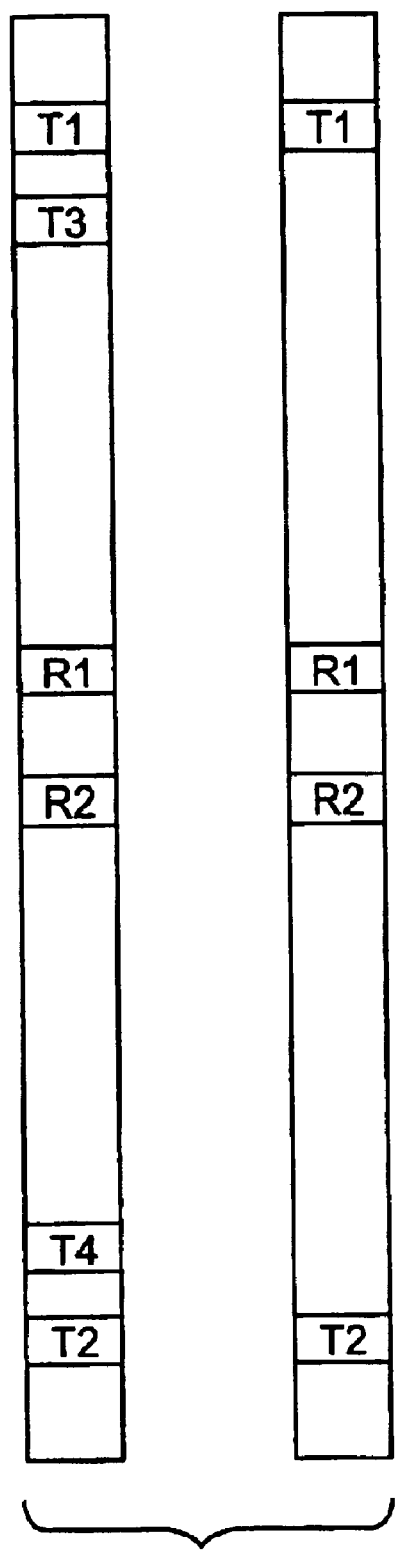
FIG. 1 is a diagram illustrating various antenna configurations of respective well logging devices that are known in the prior art.

FIG. 1 illustrates two known well logging devices. Each of the known well logging devices includes a pair of receiving antennas R1, R2 and at least one pair of transmitting antennas T1, T2 mounted on a cylindrical housing. U.S. Pat. Nos. 4,899,122, 4,949,045 and 4,968,940 each discloses such a well logging device. An additional pair of transmitting antennas T3, T4 may be mounted on the housing. Each of the receiving antennas R1, R2 are longitudinally positioned between a upper transmitting antenna T1 and a lower transmitting antenna T2. Further, if additional transmitting antennas T3, T4 are mounted on the housing, receiving antennas R1, R2 are longitudinally positioned between two upper transmitting antennas T1, T3 and two lower transmitting antennas T2, T4.

FIGS. 2A–2E illustrate exemplary embodiments of a well logging device in accordance with the present invention. Each of the well logging devices illustrated in FIGS. 2A–2E include a generally cylindrical housing 3 on or within which at least one pair of transmitting antennas and at least one pair of receiving antennas are affixed. In particular, housing 3 may include a number of recesses formed therein for accommodating a respective receiving or transmitting antenna. Each of the antennas may include, for example, a solenoid coil.

A drill bit 1 is connected to the lower end of housing 3. Drill bit 1 may be rotated to drill a borehole 7 within earth formation 9. In order to drill borehole 7, drilling fluid is passed through the center portion of housing 3 and ejected through outlet ports (not shown) in drill bit 1. The drilling fluid is circulated upward in order to carry portions of the formation that have been cut by the rotation of drill bit 1 towards the earth surface. Arrows 5 illustrate the direction of the drilling fluid as it passes downward through the center of housing 3 and upward toward the earth surface of housing 3 after being ejected from the outlet ports of drill bit 1.

By arranging drill bit 1 proximately to housing 3 and rotating at least drill bit 1 (housing 3 may be rotated along with drill bit 1), signals of electromagnetic energy may be transmitted by any of the transmitting antennas and received by any of the receiving antennas while borehole 7 is being drilled. Accordingly, any of the exemplary well logging devices illustrated in FIGS. 2A–2E are capable of performing a measuring-while-drilling (MWD) technique.

Figures 2A, 2B, 2C:
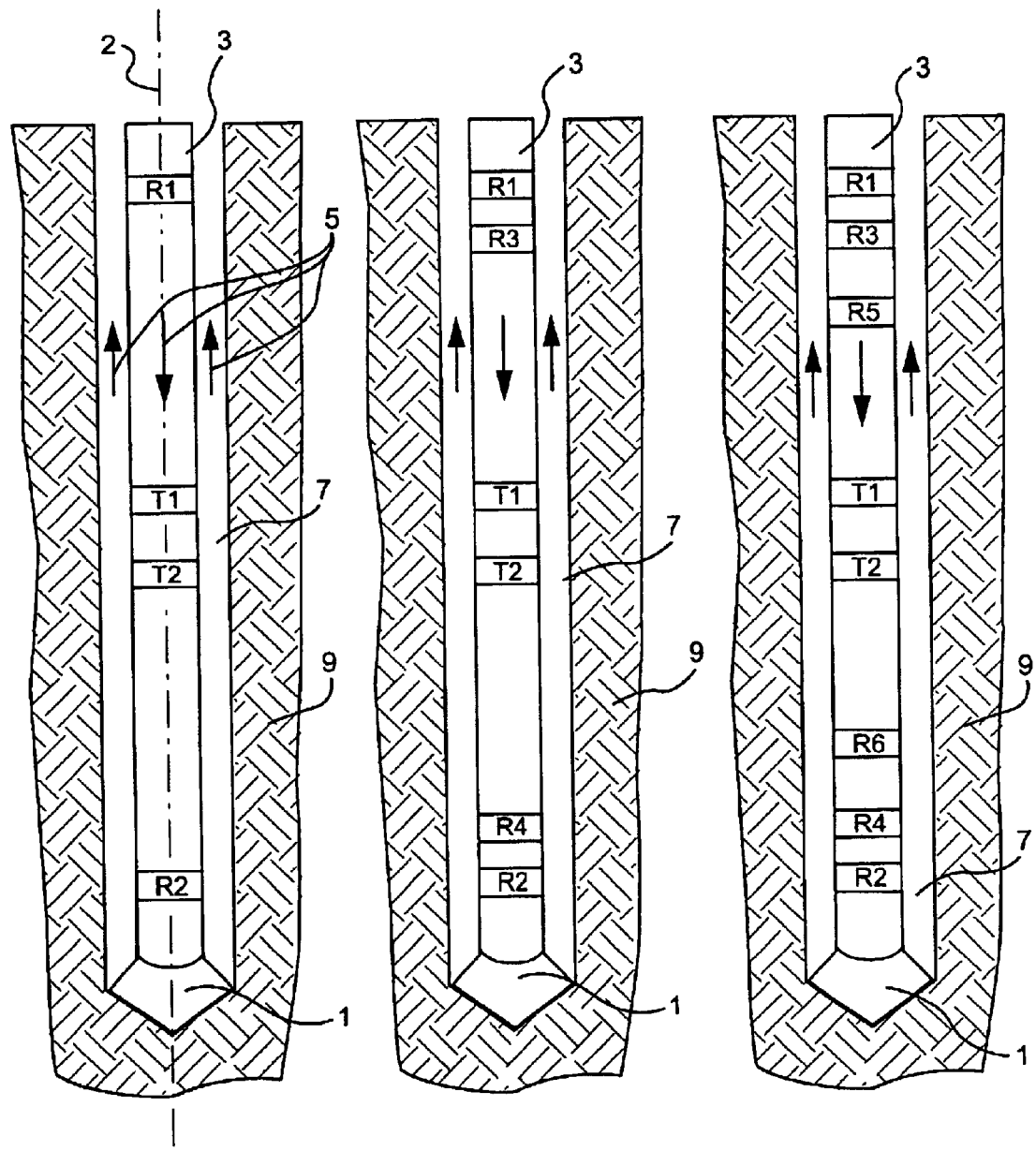
FIG. 2A is a diagram illustrating a well logging device having a pair of transmitting antennas and a pair of receiving antennas in accordance with an exemplary embodiment of the present invention.
FIG. 2B is a diagram illustrating a well logging device having a pair of transmitting antennas and two pairs of receiving antennas in accordance with another exemplary embodiment of the present invention.
FIG. 2C is a diagram illustrating a well logging device having a pair of transmitting antennas and six receiving antennas in accordance with another exemplary embodiment of the present invention.

Referring to FIG. 2A, one exemplary embodiment of the present invention is a (MWD) well logging device that includes a single pair of transmitting antennas T1, T2 which are longitudinally positioned between a pair of receiving antennas R1, R2. That is, receiving antenna R1 is located at a position along imaginary longitudinal axis 2 of housing 3 above both of transmitting antennas T1, T2 and receiving antenna R2 is located at a position along longitudinal axis 2 below both of transmitting antennas T1, T2.

FIG. 2B illustrates another exemplary embodiment of a MWD well logging device including two receiving antennas R1, R3 affixed to housing 3 at respective longitudinal positions above a pair of transmitting antennas T1, T2 and two other receiving antennas R2, R4 affixed to housing 3 at respective longitudinal positions below the pair of transmitting antennas T1, T2. Corresponding recesses may be formed in housing 3 to accommodate each of the receiving antennas R1–R4. An electromagnetic wave transmitted from transmitting antenna T1 or T2 propagates into and through formation 9 surrounding borehole 7 and is received by receiving antennas R1–R4.

FIG. 2C illustrates another exemplary embodiment of a MWD well logging device having three receiving antennas R1, R3, R5 affixed to housing 3 at respective longitudinal positions above a pair of transmitting antennas T1, T2 and three receiving antennas R2, R4 and R6 affixed to housing 3 at respective longitudinal positions below the pair of transmitting antennas T1, T2. An electromagnetic wave transmitted from either of the transmitting antennas T1 or T2 propagates into and through formation 9 surrounding borehole 7 and is received by receiving antennas R1–R6.

Figure 2D:
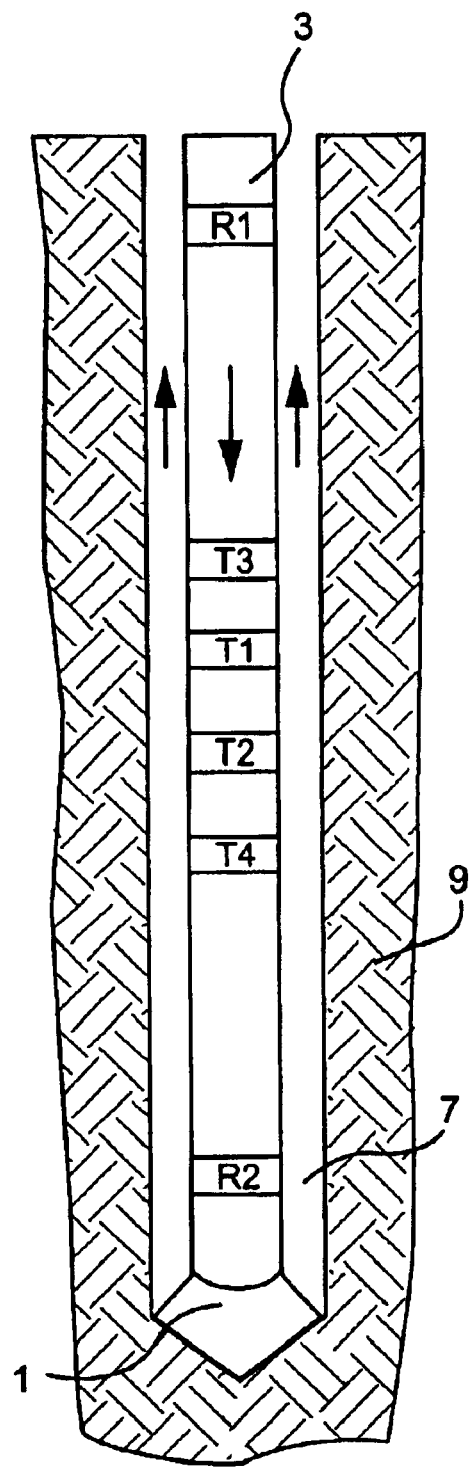
FIG. 2D is a diagram illustrating a well logging device having two pairs of transmitting antennas and a pair of receiving antennas in accordance with another exemplary embodiment of the present invention.

FIG. 2D illustrates another exemplary embodiment of a MWD well logging device in accordance with the present invention. The well logging device illustrated in FIG. 2D includes four transmitting antennas T1, T2, T3, T4 affixed to housing 3. Like transmitting antennas T1 and T2, transmitting antennas T3 and T4 have respective longitudinal positions between an upper receiving antenna R1 and a lower receiving antenna R2. In order to determine the resistivity of formation 9 surrounding borehole 7, electromagnetic wave (s) may be transmitted from transmitting antennas T1–T4. The transmission of electromagnetic waves may occur, for example, from one transmitting antenna at a time, or two transmitting antennas at a time. The electromagnetic waves transmitted from transmitting antennas T1–T4 propagate through formation 9 and are detected by receiving antennas R1, R2.

Figure 2E:
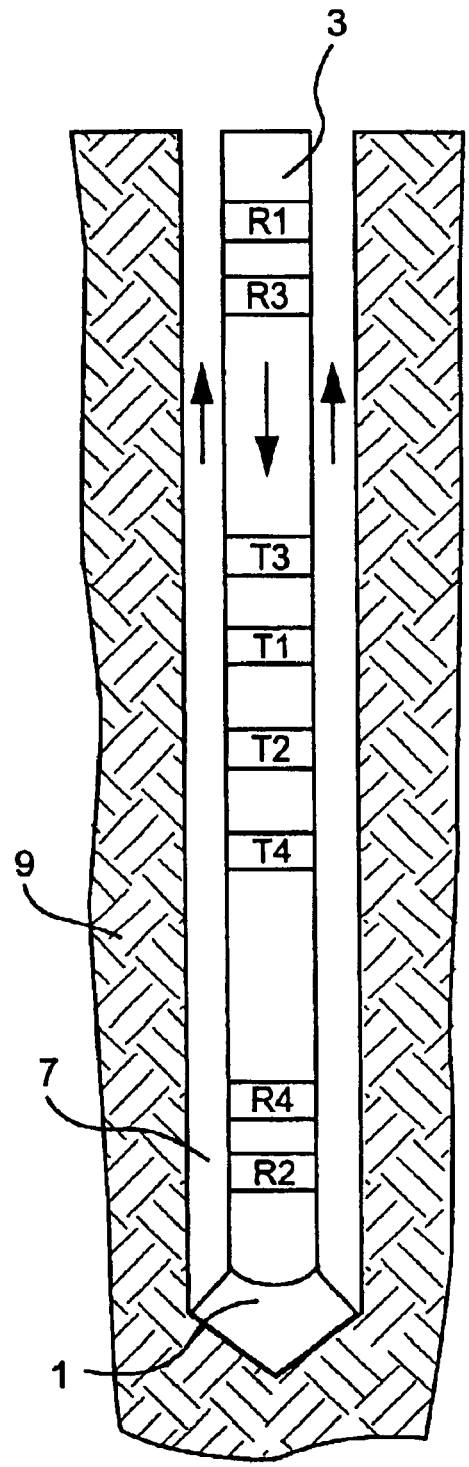
FIG. 2E is a diagram illustrating a well logging device having two pairs of transmitting antennas and two pairs of receiving antennas in accordance with another exemplary embodiment of the present invention.

FIG. 2E illustrates another exemplary embodiment of a MWD well logging device which includes multiple pairs of transmitting antennas T1–T4 and multiple pairs of receiving antennas R1–R4 affixed to housing 3. Each of the transmitting antennas T1–T4 are longitudinally located at respective positions between upper receiving antennas R1, R3 and lower receiving antennas R2, R4. One or more of the transmitting antennas T1–T4 may transmit an electromagnetic wave signal into and through formation surrounding borehole 7. The electromagnetic wave signal(s) propagated through formation 9 is detected by receiving antennas R1–R4. These detected signals can then be used to calculate the resistivity of formation 9.

Figure 3:
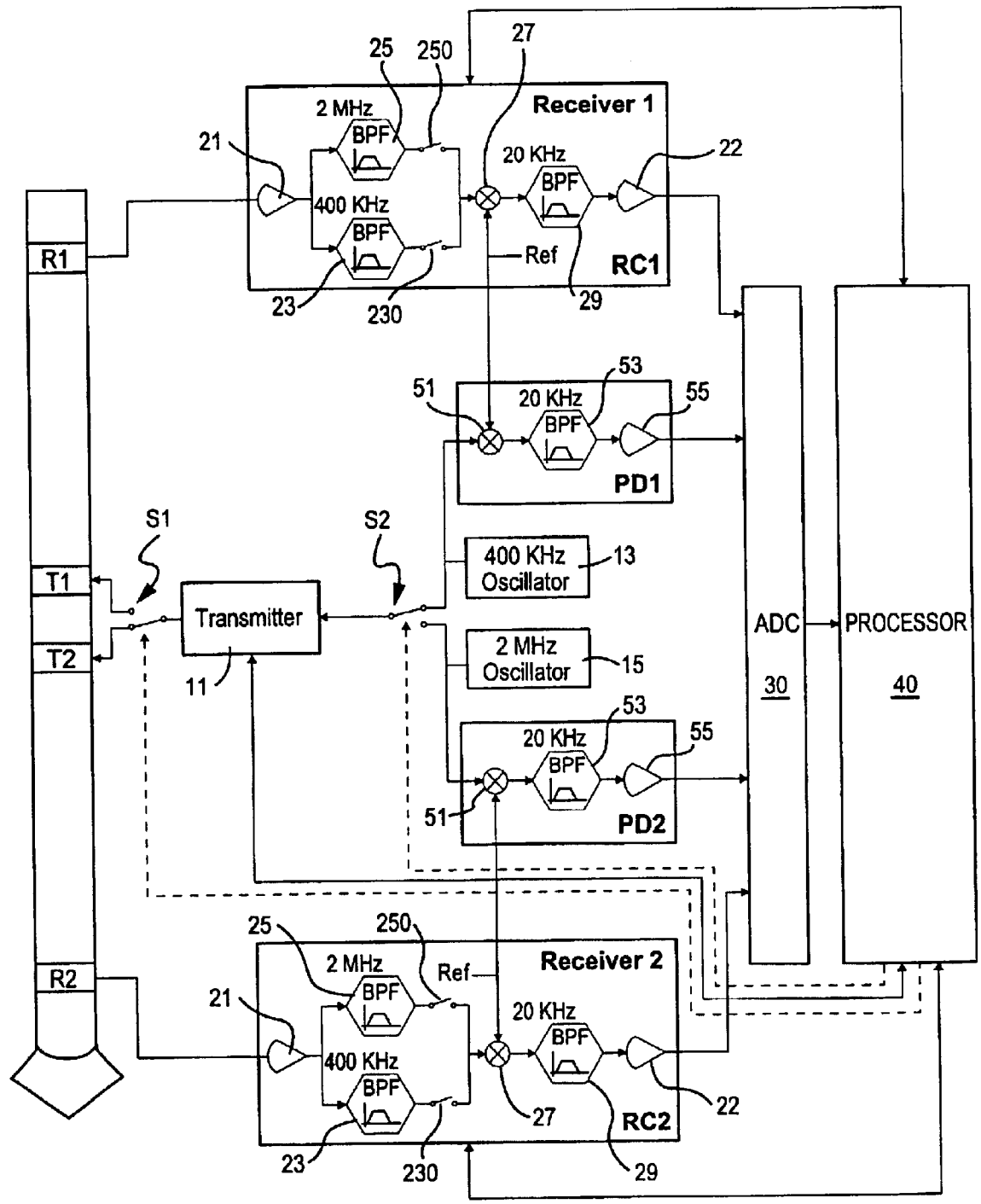
FIG. 3 is a diagram, partially in block form, illustrating the well logging device of FIG. 2A and its associated electronics.

FIG. 3 illustrates an exemplary embodiment of the present invention utilizing the well logging device illustrated in FIG. 2A and its associated transmitter, receiver and signal processing circuitry. In particular, the well logging device includes transmitting antennas T1, T2 longitudinally positioned between an upper receiving antenna R1 and a lower receiving antenna R2. Transmitting antenna T1 and transmitting antenna T2 may be alternately connected to transmitter 11 (i.e., a transmitter electronics unit) through switch S1. Transmitter 11 may also be alternately connected to either a 400 KHz oscillator 13 or a 2 MHz oscillator 15 through switch S2. Transmitter 11 and switches S1, S2 and optionally oscillators 13, 15 may be operated under the command of processor 40. Processor 40 may be formed by, for example, a general purpose microcontroller.

An electromagnetic wave transmitted by either transmitting antenna T1 or T2 is propagated through the formation 9 surrounding borehole 7 and is detected by both receiving antennas R1, R2. The wave detected by receiving antenna R1 is provided as a signal to receiver RC1, which, in turn, outputs a signal for sampling by analog-to-digital converter (ADC) 30. The wave detected by receiving antenna R2 is provided as a signal to receiver RC2, which, in turn, outputs a signal that is sampled by ADC 30. Each of the receivers RC1, RC2 includes amplifier 21, band pass filters 23, 25, switches 230, 250, mixer 27, band pass filter 29 and amplifier 22.

In the exemplary embodiment illustrated in FIG. 3, band pass filter 23 passes a signal having a frequency of 400 KHz which is the same frequency as the signal output from oscillator 13 that enables transmitter 11 to energize transmitting antenna T1 or T2 to transmit an electromagnetic wave signal at 400 KHz. Band pass filter 25 has a pass band of 2 MHz which is the same frequency as a signal output from oscillator 15 to enable transmitter 11 to enable transmitting antenna T1 or T2 to transmit an electromagnetic wave at 2 MHz. Band pass filter 29 passes a signal having a frequency of 20 KHz. It will be understood by those skilled in the art, however, that the frequencies of oscillators 13, 15 and corresponding pass bands of band pass filters 23 and 25 may be set at predetermined frequencies other than 400 KHz and 2 MHz. That is, the frequencies of the signals from oscillators 13 and 15 (400 KHz and 2 MHz, respectively) are merely examples of many possible values of frequencies contemplated by the present invention. The frequencies of the signals from oscillators 13 and 15 (whatever the predetermined frequencies of oscillators 13, 15 are) have different values. By providing signals having two different frequencies, two different radial depths of investigation in formation 9 can be investigated by the well logging device.

Since the frequency of the pass band of band pass filter 29 is set at 20 KHz, the reference frequency (labeled "Ref" in FIG. 3) will be either 2 MHz±20 KHz or 400 KHz±20 KHz depending on which of the two frequencies the detected signal is oscillating. For example, if the electromagnetic wave transmitted by transmitting antenna T1 or T2 has a frequency of 400 KHz resulting from the connection of transmitter 11 to oscillator 13, the reference signal input into mixer 27 will have a frequency of 400 KHz±20 KHz. If the electromagnetic wave transmitted from transmitting antenna T1 or T2 has a frequency of 2 MHz resulting from the connection of transmitter 11 to oscillator 15, the reference signal provided to mixer 27 will have a frequency of 2 MHz±20 KHz. Those skilled in the art, however, will understand that the frequency of the pass band of band pass filter 29 can be set to another predetermined frequency value (i.e., the 20 KHz pass band of filter 29 is merely an exemplary value at which filter 29 may be set) and the frequency of the reference signal provided to mixer 27 set accordingly.

The electromagnetic waves detected by receiving antennas R1 and R2 are thus processed by receivers RC1, RC2 and sampled and digitally converted by ADC 30. ADC 30 outputs a signal to processor 40 which calculates a compensated measurement of the resistivity of the formation at a point between the pair of transmitting antennas T1, T2 by calculating the phase shift and/or amplitude ratio between the electromagnetic waves detected by receiving antenna R1 and originating from transmitting antenna T1 and transmitting antenna T2, and calculating the phase shift and/or amplitude ratio between the electromagnetic waves detected by receiving antenna R2 and originating from transmitting antenna T1 and transmitting antenna T2. The phase shift and/or amplitude ratio of the electromagnetic waves detected by receiving antenna R1 (originating from transmitting antennas T1 and T2, respectively) and the phase shift and/or amplitude ratio of the electromagnetic waves received by receiving antenna R2 (originating from transmitting antennas T1 and T2, respectively) calculated by processor 40 allow it to determine a compensated measurement of resistivity by, for example, referring to a look up table which correlates phase shift and/or amplitude ratio measurements to formation resistivity values. The phase shift, amplitude ratio and/or resistivity values may then be stored in nonvolatile memory by processor 40, these data may be transmitted to surface via the MWD telemetry system. For example, data values may be transmitted to a monitor for display, a printer for producing hard copies of the data and/or provided to another computer system.

Processor 40 may be capable of calculating the phase shift and/or amplitude ratio between electromagnetic waves detected by receiving antenna R1 that originated from transmitting antenna T1 and transmitting antenna T2, and calculating the phase shift and/or amplitude ratio between electromagnetic waves detected by receiving antenna R2 which originated from transmitting antenna T1 and transmitting antenna T2, by utilizing inputs received from phase detectors PD1, PD2 via ADC30. As illustrated in FIG. 3, each of the phase detectors PD1, PD2 includes mixer 51, band pass filter 53 and amplifier 55. Phase detector PD1 receives an input from the 400 KHz oscillator 13 and phase detector PD2 receives an input from 2 MHz oscillator 15. Phase detector PD1 also receives as an input the reference signal that is also provided into mixer 27 of receiver RC1. Phase detector PD2 receives as an input the reference signal that is also provided into mixer 27 of receiver RC2.

Mixer 51 of phase detector PD1 multiplies the reference signal also input into mixer 27 of receiver RC1 and the 400 KHz signal provided from oscillator 13. The output of this multiplication is passed through band pass filter 53 and then through amplifier 55. Mixer 51 of phase detector PD2 multiplies the reference signal also input into mixer 27 of receiver RC2 and a 2 MHz signal provided from oscillator 15. The output of this multiplication is provided through band pass filter 53 and amplifier 55. The pass band of each band pass filter 53 is set at 20 KHz. While the pass band of each band pass filter 53 is set at 20 KHz, those skilled in the art will understand that the frequency of pass band of these filters can be set to another predetermined frequency value (i.e., the 20 KHz pass band of filters 53 is merely an exemplary value).

The output from phase detector PD1 can be used in order to calculate the phase shift and/or amplitude ratio of two 400 KHz signals (originating from transmitting antennas T1 and T2) detected by receiving antenna R1. The output from phase detector PD1 can also be used to determine the phase shift and/or amplitude ratio between the two 400 KHz electromagnetic waves detected by receiving antenna R2 (originating from transmitting antennas T1 and T2). For example, when a 400 KHz signal is transmitted from transmitter T1, the phase difference between the electromagnetic wave detected by receiving antenna R1 and the 400 KHz transmission signal originating from oscillator 13

($\Phi T1_{400\ KHz}-\Phi R1_{400\ KHz}$) and the phase difference between the electromagnetic wave detected by receiving antenna R2 and the 400 KHz transmission from oscillator 13 ($\Phi T1_{400\ KHz}-\Phi R2_{400\ KHz}$) may be calculated. Similarly, when the 400 KHz signal is transmitted from transmitting antenna T2 and detected by receiving antennas R1, R2, the phase difference between the electromagnetic wave detected by receiving antenna R1 and the transmission from 400 KHz oscillator 13 ($\Phi T2_{400\ KHz}-\Phi R1_{400\ KHz}$) and the phase difference between the electromagnetic wave detected by receiving antenna R2 and the 400 KHz transmission from oscillator 13 ($\Phi T2_{400\ KHz}-\Phi R2_{400\ KHz}$) may be determined. The 400 KHz signal from oscillator 13 is in each instance passed through phase detector PD1 which provides an output to ADC30. ADC30, in turn, provides an output to processor 40.

Processor 40 may then detect the phase shift and/or amplitude ratio between the two 400 KHz signals (originating from transmitting antennas T1 and T2, respectively) received by receiving antenna R1. For example, in order to calculate the phase difference between the two 400 KHz electromagnetic wave signals (originating from antennas T1 and T2) detected by receiving antenna R1, processor 40 calculates ($\Phi T1_{400\ KHz}-\Phi R1_{400\ KHz}$)–($\Phi T2_{400\ KHz}-\Phi R1_{400\ KHz}$)=($T1_{400\ KHz}-\Phi T2_{400\ KHz}$. Similarly, processor 40 may determine the phase shift between the two 400 KHz signals detected by receiving antenna R2 (originating from transmitting antennas T1 and T2) by calculating ($\Phi T1_{400\ KHz}-\Phi R2_{400\ KHz}$)–($\Phi T2_{400\ KHz}-\Phi R2_{400\ KHz}$)=$\Phi T1_{400\ KHz}-\Phi T2_{400\ KHz}$. The amplitude ratio between the two 400 KHz signals (one originating from transmitting antenna T1 and the other originating from transmitting antenna T2) detected by each of receiving antennas R1 and R2 may also be calculated.

In order to calculate the phase shift and/or amplitude ratio between the two 2 MHz electromagnetic waves detected by receiving antenna R1 (originating from transmitting antennas T1 and T2) and the phase shift and/or amplitude ratio of the two 2 MHz electromagnetic waves detected by receiving antenna R2 (originating from transmitting antennas T1 and T2) processor 40 will perform the same type of calculation discussed above with respect to the 400 KHz electromagnetic waves. However, the transmission phase ($\Phi T1_{2\ MHz}$ and $\Phi T2_{2\ MHz}$) originates from the signal transmitted from oscillator 15 as provided through phase detector PD2.

An exemplary operation of the well logging device to determine a compensated measurement of resistivity at a measuring point in formation 9 between transmitting antennas T1 and T2 and receiving antennas R1 and R2 is described below.

Under the command of processor 40, switches S1 and S2 connect transmitter 11 to transmitting antenna T1 and 400 KHz oscillator 13, respectively. The signal provided from oscillator 13 enables transmitter 11 to energize transmitting antenna T1 to transmit a 400 KHz electromagnetic wave into and through formation 9 surrounding borehole 7 (see FIG. 2A). The signal provided from oscillator 13 is also provided through phase detector PD1 to ADC30 which, in turn, provides a digital signal to processor 40. The electromagnetic wave originating from transmitting antenna T1 is thus propagated through formation 9 so that both receiving antennas R1 and R2 may detect the electromagnetic wave.

The signals detected by receiving antenna R1 and receiving antenna R2 are then provided to receivers RC1 and receiver RC2, respectively. Each signal received by receivers RC1 and RC2 is preamplified by amplifier 21 and passed through 400 KHz band pass filter 23 which is connected through switch 230 (in a closed state at this time) to provide an input to mixer 27. The output from amplifier 21 does not pass through band pass filter 25 since switch 250 is in an opened state at this time under the command of processor 40. The signal output from band pass filter 23 is then multiplied by a reference signal having a frequency of 400 KHz±20 KHz via mixer 27. The signal output from mixer 27 is then passed through band pass filter 29 having a pass band of 20 KHz and is then amplified by amplifier 22. The signals output from receivers RC1, RC2 are sampled and digitally converted by ADC 30 and then output to processor 40. Processor 40 stores the digital signals representing the electromagnetic waves detected by receiving antennas R1 and R2 as a result of the transmission from transmitting antenna T1.

Processor 40 then directs switch S2 to connect transmitter 11 to 2 MHz oscillator 15. Switch S1 remains connected between transmitting antenna T1 and transmitter 11. Processor 40 also directs switches 230 respectively connected to 400 KHz band pass filters 23 in receivers RC1, RC2 to open and switches 250 respectively connected to 2 MHz band pass filters 25 in receivers RC1, RC2 to close. The 2 MHz signal output from oscillator 15 is also provided to phase detector PD2 which outputs a signal to ADC30 which, in turn, outputs a signal to processor 40.

Transmitter 11 energizes transmitting antenna T1 to enable transmitting T1 to transmit a 2 MHz electromagnetic wave into and through formation 9. This electromagnetic wave propagated through formation 9 is detected by receiving antennas R1 and R2 and then passed through receivers RC1 and RC2, respectively. In particular, the signals detected by receivers RC1, RC2 are each amplified by amplifier 22, filtered by band pass filter 25 (switch 250 is in a closed state at this time), multiplied with a reference signal having a frequency of 2 MHz±20 KHz by mixer 27, passed through band pass filter 29 and amplified by amplifier 22. The signals output from receivers RC1 and RC2 are sampled and digitally converted by ADC 30 which in turn provides a signal to processor 40 for storage.

Processor 40 then commands switch S2 to flip so that the 400 KHz oscillator 13 is again connected to transmitter 11. 2 MHz oscillator 15 is thus disconnected from transmitter 11 by switch S2 at this time. Processor 40 also commands switch S1 to flip so that transmitter 11 is connected to transmitting antenna T2 instead of transmitting antenna T1. Switch 230 in each of receivers RC1, RC2 is closed and switch 250 in each of receivers RC1, RC2 is opened. Through its connection to oscillator 13, transmitter 11 energizes transmitting antenna T2 to transmit a 400 KHz electromagnetic wave into and through formation 9. The 400 KHz signal from oscillator 13 is provided through phase detector PD1 to ADC30, which in turn, provides an output to processor 40. The electromagnetic wave propagated through formation 9 originating from transmitting antenna T2 is then detected by receiving antennas R1 and R2. The signals detected by receiving antennas R1 and R2 are then provided to receivers RC1 and RC2, respectively. Receivers RC1 and RC2 process the received signals in the manner discussed above with respect to the signals received from transmitting antenna T1. Namely, each of signals detected by receivers RC1, RC2 originating from transmitting antenna T2 is pre-amplified by amplifier 21, filtered by filter 23, (switch 230 is closed at this time) multiplied with a signal having a frequency of 400 KHz±20 KHz by mixer 27, filtered by band pass filter 29, and amplified by amplifier 22. Each receiver RC1, RC2 provides an output signal for sampling and digital conversion by ADC 30. ADC 30 then provides a digital signal to processor 40 which stores the received signals.

Processor 40 then directs switch S2 to connect transmitter 11 to 2 MHz oscillator 15 rather than 400 KHz oscillator 13. Processor 40 also directs switches 250 in receivers RC1 and RC2 to close and switches 230 KHz in receivers RC1 and RC2 to open. Through its connection to oscillator 15, transmitter 11 energizes transmitting antenna T2 to transmit a 2 MHz electromagnetic wave into and through formation 9. The 2 MHz signal output from oscillator 15 is provided through phase detector PD2 to ADC30, which in turn, provides an output to processor 40. The electromagnetic wave propagated through formation 9 originating from transmitter T2 is detected by receiving antennas R1 and R2. The signals detected by receiving antennas R1 and R2 are then provided to receivers RC1 and RC2, respectively. Receivers RC1 and RC2 process the received signals as discussed above including filtering the signal pre-amplified by amplifier 21 through 2 MHz band pass filter 25 (400 KHz band pass filter 23 is disconnected). The outputs from receivers RC1 and RC2 are provided for sampling by ADC 30 which converts the received signal into a digital form and outputs this signal to processor 40 for storage.

Processor 40 is then capable of calculating the following: (1) the phase shift and/or amplitude ratio of the two 400 KHz electromagnetic wave signals detected by receiving antenna R1 which originate from transmitting antennas T1 and T2, respectively, $\{$e.g., $(\Phi T1_{400\ KHz} - \Phi R1_{400\ KHz}) - (\Phi T2_{400\ KHz} - \Phi R1_{400\ KHz}) = \Phi T1_{400\ KHz} - \Phi T2_{400\ KHz}\}$ (2) the phase shift and/or amplitude ratio of the two 400 KHz electromagnetic wave signals detected by receiving antenna R2 which originate from transmitting antennas T1 and T2, respectively, $\{$e.g., $(\Phi T1_{400\ KHz} - \Phi R2_{400\ KHz}) - (\Phi T2_{400\ KHz} - \Phi R2_{400\ KHz}) = \Phi T1_{400\ KHz} - \Phi T2_{400\ KHz}\}$ (3) the amplitude ratio and/or phase shift of the two 2 MHz electromagnetic wave signals detected by receiving antenna R1 which originate from transmitting antennas T1 and T2, respectively, $\{$e.g., $(\Phi T1_{2\ MHz} - \Phi R1_{2\ MHz}) - (\Phi T2_{2\ MHz} - \Phi R1_{2\ MHz}) = \Phi T1_{2\ MHz} - \Phi T2_{2\ MHz}\}$ and (4) the phase shift or amplitude ratio of the two 2 MHz electromagnetic wave signals received by receiving antenna R2 which originate from transmitting antennas T1 and T2, respectively $\{$e.g., $(\Phi T1_{2\ MHz} - \Phi R2_{2\ MHz}) - (\Phi T2_{2\ MHz} - \Phi R2_{2\ MHz}) = \Phi T1_{2\ MHz} - \Phi T2_{2\ MHz}\}$. Through these phase shift and/or amplitude ratio calculations, processor 40 determines a compensated measurement of formation resistivity by, for example, referring to a look up table which relates phase shift and/or amplitude ratio to formation resistivity. That is, phase shift and/or amplitude measurements may be related to formation resistivity by a transform. This transform is generally (but not necessarily) applied at the surface. By performing the measurements at two different frequencies (e.g., 400 KHz and 2 MHz), two different radial depths of investigation in the formation may be investigated. Other formation properties other than resistivity may be determined based on the phase shift and/or amplitude ratio measurements such as the dielectric constant of the formation containing fluids or gases.

Those skilled in the art will appreciate that the exemplary embodiment illustrated in FIG. 3 can be modified in various fashions in accordance with the present invention. For example, switches S1 and S2 may be controlled by processor 40 so that the first transmission of an electromagnetic wave is from transmitting antenna T1 at 400 KHz, and the second transmission of an electromagnetic wave signal is from transmitting antenna T2 (rather than T1 as discussed above) at the same frequency of 400 KHz. During these first and second transmissions, the respective switches 230 in receivers RC1 and RC2 are in a closed state and the respective switches 250 in receivers RC1 and RC2 are in an opened state. The 400 KHz signal transmitted from transmitting antenna T1 is detected by receiving antennas R1 and R2 and processed by receivers RC1 and RC2, respectively, converted to digital form by ADC 30 and provided to processor 40 for storage. Similarly, the 400 KHz electromagnetic wave transmitted from transmitting antenna T2 during this second stage of transmission is received by both receiving antennas R1, R2 and processed by receivers RC1, RC2. The signals output from receiving antennas RC1 and RC2 are digitally converted by ADC 30 and provided to processor 40 for storage. Processor 40 may then calculate the phase shift and/or amplitude ratio between the two 400 KHz electromagnetic waves detected by receiving antenna R1 (one originating from transmitting antenna T1 and the other originating from transmitting antenna T2) and the phase shift and/or amplitude ratio between the two 400 KHz electromagnetic waves received by receiving antenna R2 (one originating from transmitting antenna T1 and the other originating from transmitting antenna T2). The processor may then calculate a compensated measurement of formation resistivity based on the calculated amplitude and/or phase shift measurements at one radial depth of investigation and at a measuring point between transmitting antennas T1 and T2.

After each of the two successive 400 KHz electromagnetic waves transmitted from antennas T1 and T2 have been detected by both receiving antennas R1 and R2 and processed, transmitting antennas T1 and T2 may successively transmit 2 MHz electromagnetic waves for detection by both receiving antennas R1 and R2. By transmitting 2 MHz electromagnetic waves from each transmitting antenna T1 and T2 after transmitting 400 KHz electromagnetic waves, formation resistivity measurements may be determined by processor 40 for another radial depth of investigation in the formation.

Instead of first transmitting 400 KHz electromagnetic waves from transmitting antenna T1 and then from transmitting antenna T2, electromagnetic waves having a frequency of 2 MHz may be first transmitted from transmitting antenna T1 and then from transmitting antenna T2. This may be accomplished by first connecting transmitter 11 to oscillator 15 instead of oscillator 13, closing the switches connected to 2 MHz band pass filters 25 in receivers RC1 and RC2 and opening the switches connected to 400 KHz band pass filters 23 in receivers RC1 and RC2.

In all of the following embodiments, reference numbers corresponding to parts described in previous exemplary embodiments shall remain the same. Only the differences from previous exemplary embodiments shall be discussed in detail.

Figure 4:
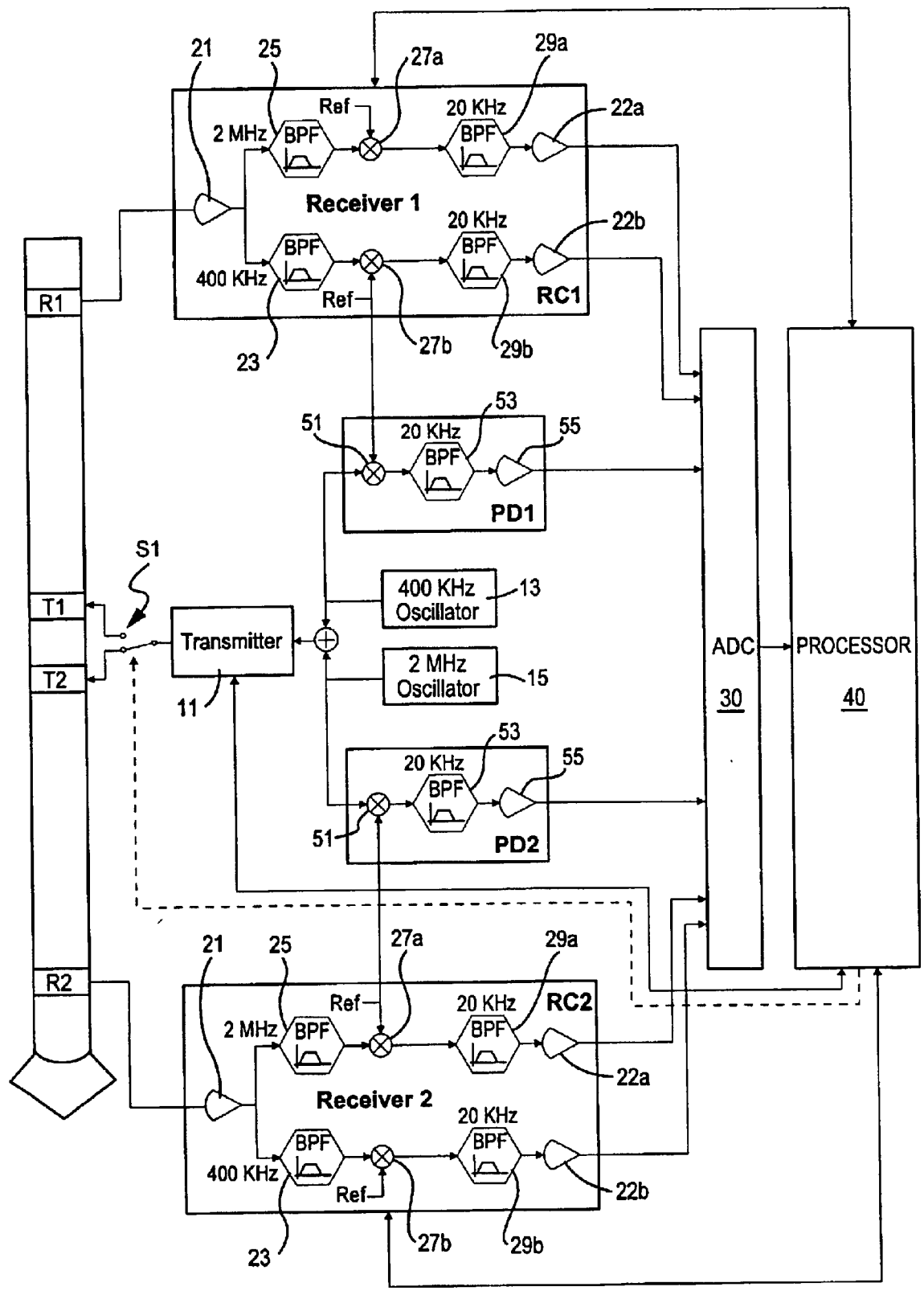
FIG. 4 is a diagram, partially in block form, illustrating the well logging device of FIG. 2A and its associated electronics which enables a transmitting antenna to transmit an electromagnetic wave signal simultaneously having more than one frequency.

Referring now to FIG. 4, another exemplary embodiment of a well logging device in accordance with the present invention includes a dual frequency design for transmitting and receiving electromagnetic waves. In particular, transmitter 11 is connected to an adder (which optionally may be part of the transmitter 11 itself) that receives inputs from both oscillators 13 and 15 to enable transmitter 11 to energize a transmitting antenna T1 or T2 so that the electromagnetic wave signal transmitted therefrom simultaneously contains more than one frequency component (e.g., 400 KHz and 2 MHz components). By simultaneously transmitting an electromagnetic wave having more than one frequency component from a single antenna, the time required for measurements necessary for two different radial depths of investigation may be reduced.

In the exemplary embodiment of FIG. 4, receivers RC1 an RC2 each includes an amplifier 21, band pass filters 23 and 25, mixers 27a, 27b, band pass filters 29a, 29b and amplifiers 22a, 22b. Since the electromagnetic wave propagated through formation 9 and detected by receiving antennas R1 and R2 includes two frequencies components (e.g., 400 KHz from oscillator 13 and 2 MHz from oscillator 15), receivers RC1 and RC2 process the signals through band pass filters 23 and 25 after being preamplified by amplifier 21. The frequencies of band pass filters 23 and 25 correspond to the frequencies of oscillators 13 and 15. The reference signal input into mixer 27a has a frequency of 2 MHz±20 KHz (that is, 1980 MHz or 2020 MHz) and the reference signal input into mixer 27b has a frequency of 400 KHz±20 KHz (that is, 380 KHz or 420 KHz).

Oscillator 13 provides a 400 KHz signal to phase detector PD1 and oscillator 15 provides a 2 MHz signal to phase detector PD2. Like the exemplary embodiment of FIG. 3 (and all exemplary embodiments discussed below) each of the phase detectors PD1, PD2 includes a serial connection of mixer 51, band pass filter 53 and amplifier 55. The outputs of each of the phase detectors PD1, PD2 are provided to ADC30, which in turn, provides respective outputs to processor 40. Mixer 51 of phase detector PD1 receives a 400 KHz signal from oscillator 13 and the reference signal also input into mixer 27b of receiver RC1 and/or RC2 which has a frequency of 400 KHz±20 KHz. Mixer 51 of phase detector PD2 receives a 2 MHz signal from oscillator 15 and the reference signal also input into mixer 27a of receiver RC1 and/or RC2 having a frequency of 2 MHz±20 KHz. The signal output from phase detector PD1 allows processor 40 to calculate the phase shift and/or amplitude ratio of two 400 KHz electromagnetic waves (one originating from transmitting antenna T1 and the other originating from transmitting antenna T2) detected by receiving antenna R1 and the phase shift and/or amplitude ratio of two 400 KHz electromagnetic waves (one originating from transmitting antenna T1 and the other originating from transmitting antenna T2) detected by receiving antenna R2. The signal output from phase detector PD2 allows processor 40 to calculate the phase shift and/or amplitude ratio between two 2 MHz electromagnetic waves (one transmitted from transmitting antenna T1 and the other transmitted from transmitting antenna T2) detected by receiving antenna R1 and the phase shift and/or amplitude ratio of two 2 MHz electromagnetic waves (one originating from transmitting antenna T1 and the other originating from transmitting antenna T2) detected by receiving antenna R2. As one example, the phase shift between 400 KHz electromagnetic waves detected by receiving antenna R1 originating from transmitting antennas T1 and T2 may be calculated by subtracting (1) the phase difference between the 400 KHz signal output from oscillator 13 and processed by phase detector PD1 when oscillator 13 is coupled to transmitting antenna T1 and the phase of the electromagnetic wave detected by receiving antenna R1 originating from transmitting antenna T1 ($\Phi T1_{400\ KHz} - \Phi R1_{400\ KHz}$), and (2) the phase difference between the signal output from oscillator 13 and processed by phase detector PD1 when oscillator 13 is coupled to transmitting antenna T2 and the electromagnetic wave detected by receiving antenna R1 originating from transmitting antenna T2 ($\Phi T2_{400\ KHz} - \Phi R1_{400\ KHz}$). That is, processor 41 can calculate the phase shift between the two 400 KHz electromagnetic waves transmitted from transmitting antenna T1 and the electromagnetic wave transmitted from transmitting antenna T2 by calculating ($\Phi T1_{400\ KHz} - \Phi R1_{400\ KHz}$)−($\Phi T2_{400\ KHz} - \Phi R1_{400\ KHz}$).

In operation, processor 40 directs switch S1 to connect transmitter 11 to transmitting antenna T1. Transmitter 11 energizes transmitting antenna T1 to simultaneously transmit an electromagnetic wave having more than one frequency component. For example, the electromagnetic wave transmitted from transmitting antenna T1 has a 400 KHz component (as a result of oscillator 13) and a 2 MHz frequency component (as a result of oscillator 15). A 400 KHz signal from oscillator 13 and a 2 MHz signal from oscillator 15 are respectively provided through phase detectors PD1 and PD2, to ADC30 which, in turn, provides respective outputs to processor 40. The electromagnetic waves transmitted by antenna T1 propagates through the formation 9 and are detected by both receiving antennas R1 and R2. Receiving antennas R1 and R2 provide these detected signals to receivers RC1 and RC2, respectively, for processing. In particular, each of the waves detected by receivers RC1 and RC2 are processed so that data relating to each of the two frequency components of the transmitted signal (e.g., 2 MHz and 400 KHz frequency components) are isolated and independently processed. Output signals are provided from receivers RC1, RC2 to ADC 30 for conversion to digital form. In particular, receiver RC1, RC2 provides two outputs to processor 40, one reflecting the processing of the 2 MHz component of the detected signal and the other reflecting the processing of the 400 KHz component of the detected signal. The digital signals are then provided by ADC 30 to processor 40 for storage.

Processor 40 then directs switch S1 to connect transmitter 11 to transmitting antenna T2 (rather than transmitting antenna T1). Transmitter 11 energizes transmitting antenna T2 to transmit an electromagnetic wave having more than one frequency. For example, like the electromagnetic wave earlier transmitted by transmitting antenna T1, the electromagnetic wave transmitted by transmitting antenna T2 contains 400 KHz and 2 MHz frequency components. A 400 KHz signal and a 2 MHz signal from oscillators 13 and 15, respectively, are provided through phase detectors PD1 and PD2, respectively, to ADC30 which in turn, provides outputs to processor 40. The electromagnetic wave transmitted from transmitting antenna T2 propagates through formation 9 and is received by receiving antennas R1 and R2. The signals detected by receiving antennas R1 and R2 from transmitting antenna T2 are then respectively provided to receivers RC1 and RC2 for processing in the same manner that the detected signals originating from transmitting antenna T1 were previously processed. Signals are then output by receivers RC1 and RC2 for sampling and conversion to digital form by ADC 30 which, in turn, provides an output to processor 40.

Processor 40 calculates (1) the phase shift and/or amplitude ratio of the two 400 KHz electromagnetic wave components detected by receiving antenna R1 which originated from transmitting antennas T1 and T2, (2) the phase shift and/or amplitude ratio between the 400 KHz electromagnetic wave components detected by receiving antenna R2 which originated from transmitting antennas T1 and T2, (3) the phase shift and/or amplitude ratio of the two 2 MHz electromagnetic wave components detected by receiving antenna R1 which originated from transmitting antennas T1 and T2, and (4) the phase shift and/or amplitude ratio of the two 2 MHz electromagnetic wave components detected by receiving antenna R2 which originated from transmitting antennas T1 and T2. From these phase shift and/or amplitude calculations, processor 40 determines a compensated measurement of formation resistivity at two different radial depths of investigation of the formation for a measuring point located between the transmitting antennas T1 and T2.

In this and other exemplary embodiments of the present invention discussed below, processor 40 may also calculate the dielectric constant of the formation containing fluids or gases.

By simultaneously transmitting more than one frequency from the same transmitting antenna at one given time, the time needed for a measurement cycle can be further reduced. Only two transmissions (one from transmitting antenna T1 and one from transmitting antenna T2) are needed to obtain the data necessary to calculate a compensated measurement of formation resistivity at two different radial depths of investigation. In contrast for example, the exemplary embodiment illustrated in FIG. 3 requires four transmissions of electromagnetic wave energy (two transmissions from transmitting antenna T1 and two transmissions from transmitting antenna T2) to determine the same amount of data.

Figure 5:
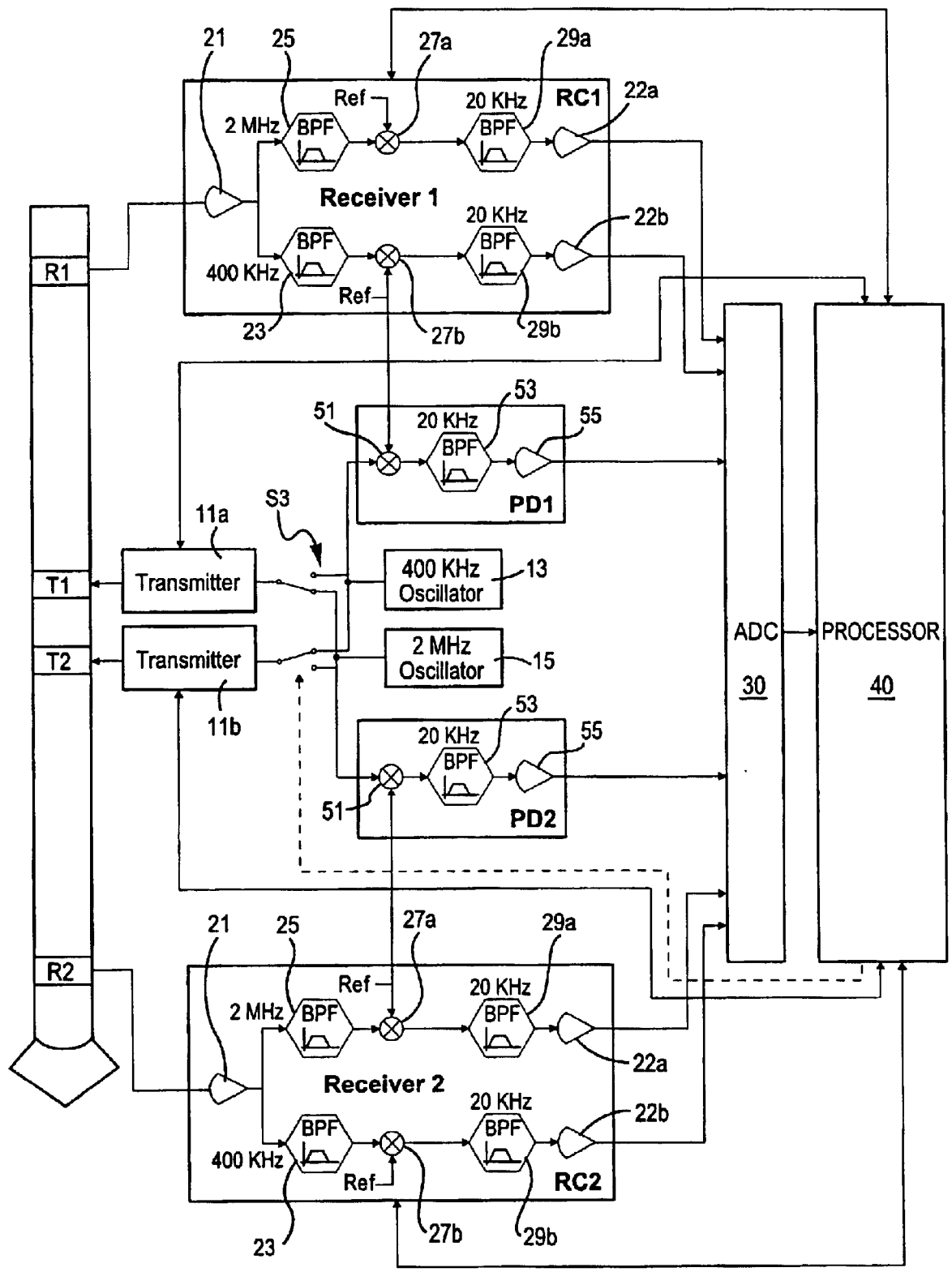
FIG. 5 is a diagram, partially in block form, illustrating the well logging device of FIG. 2A and its associated electronics which enables simultaneous transmission of electromagnetic wave signals from two different transmitting antennas.

Referring now to FIG. 5, another exemplary embodiment of the well logging device in accordance with the present invention includes a dual transmitter design for simultaneously transmitting respective electromagnetic waves from two different transmitting antennas. One transmitting antenna transmits an electromagnetic wave at a higher frequency (e.g., 2 MHz) while the other transmitting antenna simultaneously transmits an electromagnetic wave at a lower frequency (e.g., 400 KHz).

Instead of a single transmitter 11 as illustrated in the exemplary embodiments of FIGS. 3 and 4, the exemplary embodiment illustrated in FIG. 5 includes two transmitters 11a, 11b. Each of the transmitters 11a and 11b may be alternately connected through switch S3 to oscillator 13 or 15. In particular, when transmitter 11a is connected through switch S3 to oscillator 15, transmitter 11b is simultaneously connected to oscillator 13 as illustrated in FIG. 5. On the other hand, if transmitter 11a is connected to oscillator 13, transmitter 11b is connected to oscillator 15. Switch S3 is operated under the direction of processor 40. Receivers RC1 and RC2 are identical to the receivers illustrated in the exemplary embodiment of FIG. 4.

Like the exemplary embodiment of FIG. 4, the exemplary embodiment of FIG. 5 includes phase detectors PD1 and PD2 which respectively receive inputs from 400 KHz oscillator 13 and 2 MHz oscillator 15. Mixer 51 of phase detector PD1 receives the 400 KHz signal from oscillator 13 and the reference signal also provided to mixer 27b of receiver RC1 and/or RC2, and mixer 51 of phase detector PD2 receives a 2 MHz signal from oscillator 15 and the reference signal also input to mixer 27a of receiver RC1 and/or RC2. As discussed above, through the outputs of phase detectors PD1 and PD2, processor 40 may calculate the phase shift and/or amplitude ratio between electromagnetic waves detected by receiving antenna R1 which originated from transmitting antennas T1 and T2 at a certain frequency and the phase shift and/or amplitude ratio between two electromagnetic waves detected by receiving antenna R2 which originated from transmitting antennas T1 and T2 at a certain frequency. As one example, processor 40 may calculate the phase shift between two 2 MHz electromagnetic waves originating from transmitting antennas T1 and T2, respectively, and detected by receiving antenna R2 by calculating $(\Phi T1_{2\ MHz} - \Phi R2_{2\ MHz}) - (\Phi T2_{2\ MHz} - \Phi R2_{2\ MHz}) = (\Phi T1_{2\ MHz} - \Phi T2_{2\ MHz})$ detected at receiving antenna R2, where $(\Phi T1_{2\ MHz} - \Phi R2_{2\ MHz})$ is the phase difference between the signal from oscillator 15 and processed through phase detector PD2 when oscillator 15 is coupled to transmitting antenna T1 and the electromagnetic wave detected by receiving antenna R2 from transmitting antenna T1, and $(\Phi T2_{2\ MHz} - \Phi R2_{2\ MHz})$ is the phase difference between the 2 MHz signal output from oscillator 15 and processed by phase detector PD2 when oscillator 15 is coupled to transmitting antenna T2 and the electromagnetic wave detected by receiving antenna R2 which originated from transmitting antenna T2.

In operation, switch S3 connects one of the transmitters 11a to oscillator 15 and the other of the transmitters 11b to oscillator 13. Through its connection to oscillator 15, transmitter 11a enables transmitting antenna T1 to emit an electromagnetic wave having a frequency of 2 MHz for detection by both receiving antennas R1 and R2. Simultaneously, through its connection to oscillator 13, transmitter 11b energizes transmitting antenna T2 to transmit an electromagnetic wave having a frequency of 400 KHz for detection by both receiving antennas R1 and R2. A 400 KHz signal and a 2 MHz signal from oscillators 13 and 15, respectively, are provided through phase detectors PD1 and PD2, respectively, to ADC30 which in turn, provides an output to processor 40.

Receiving antenna R1 thus simultaneously receives electromagnetic waves propagated through formation 9 from transmitting antennas T1 and T2. Receiving antenna R2 also simultaneously detects the two electromagnetic waves propagated through formation 9 from transmitting antennas T1 and T2. The wave received by receiving antenna R1 which is composed of two frequency components, a frequency component of 2 MHz corresponding to transmitting antenna T1 and a frequency component of 400 KHz corresponding to transmitting antenna T2, is processed by receiver RC1. Simultaneously, the wave detected by receiving antenna R2, which is composed of two frequency components, a frequency component of 2 MHz corresponding to transmitting antenna T1 and a frequency component of 400 KHz corresponding to transmitting antenna T2, is processed by receiver RC2. The signals output from receivers RC1 and RC2 are sampled and digitally converted by ADC 30. An output from ADC 30 is provided to processor 40, which stores the digital data.

Switch S3 is then directed by processor 40 to connect transmitter 11a to oscillator 13 and transmitter 11b to oscillator 15. Transmitters 11a and 11b energize transmitting antennas T1 and T2, respectively, to simultaneously transmit 400 KHz and 2 MHz electromagnetic waves for detection by receiving antennas R1 and R2. A 400 KHz signal and a 2 MHz signal provided from oscillators 13 and 15, respectively, are provided through phase detectors PD1 and PD2, respectively, to ADC30 which in turn, provides outputs to processor 40. Receiving antenna R1 receives electromagnetic waves propagated through formation 9, one from transmitting antenna T1 having a frequency of 400 KHz and the other signal from transmitting antenna T2 having a frequency of 2 MHz. Correspondingly, receiving antenna R2 also receives the 400 KHz electromagnetic wave propagated through formation 9 from transmitting antenna T1 and the 2 MHz electromagnetic propagated through formation 9 from transmitting antenna T2. The signal received by each of receiving antennas R1 and R2 are processed by receivers RC1 and RC2, respectively. Outputs of the signals provided from RC1 and RC2 are sampled and converted to digital form by ADC 30. ADC 30 provides an output to processor 40 to store the digital representations of the signals provided from receivers RC1 and RC2.

Processor 40 calculates (1) the phase shift and/or amplitude ratio between the two 400 KHz electromagnetic waves detected by receiving antenna R1 which respectively originated from transmitting antennas T1 and T2, (2) the phase shift and/or amplitude ratio between the two 400 KHz electromagnetic waves detected by receiving antenna R2 which respectively originated from transmitting antennas T1 and T2, (3) the phase shift and/or amplitude ratio between the two 2 MHz electromagnetic waves detected by receiving antenna R1 which respectively originated from transmitting antennas T1 and T2, and (4) the phase shift and/or amplitude ratio between the two 2 MHz electromagnetic waves detected by receiving antenna R2 which respectively originated from transmitting antennas T1 and T2. Based on these phase shift and/or amplitude ratio calculations, a compensated measurement of formation resistivity may be calculated at two different radial depths of investigation for a measuring point located between the transmitting antennas T1 and T2.

By simultaneously transmitting electromagnetic wave signals having two different frequencies, the amount of measurement time can be further reduced. For example, as compared with the exemplary embodiment of FIG. 3 which requires four successive transmissions of electromagnetic energy, the exemplary embodiment of FIG. 5 can accomplish the necessary electromagnetic wave energy transmission in approximately half of the time since respective electromagnetic wave signals are being transmitted from both transmitting antennas T1 and T2 simultaneously.

Figure 6:
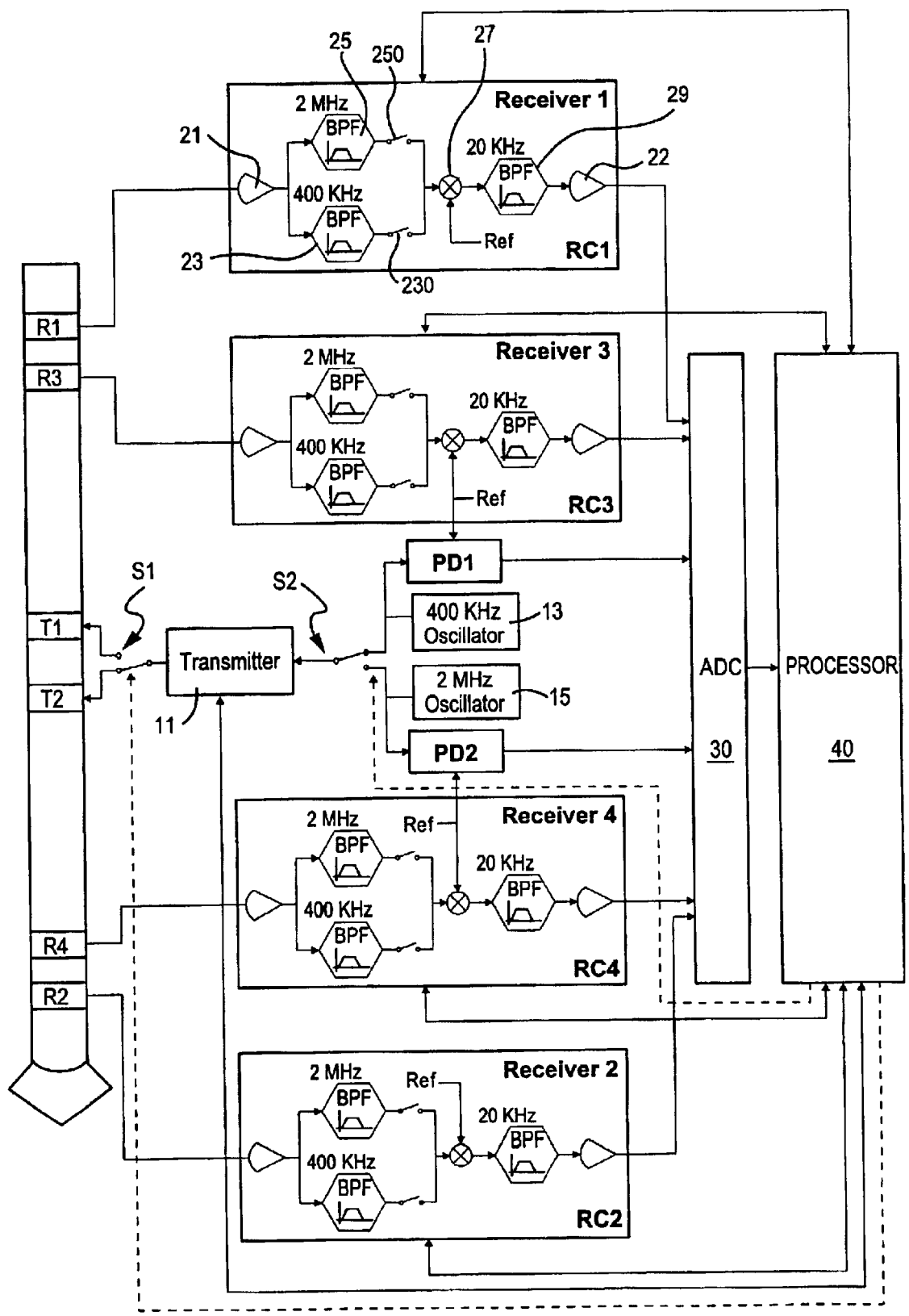
FIG. 6 is a diagram, partially in block form, illustrating the well logging device of FIG. 2B and its associated electronics.

FIG. 6 illustrates an exemplary embodiment of the present invention including the well logging device of FIG. 2B and its associated receiver, transmitter and signal processing circuitry. The exemplary embodiment of FIG. 6 includes two transmitting antennas T1, T2 affixed to housing 3 at respective longitudinal positions between receiving antennas R1 and R2. Additionally, the device further includes a third receiving antenna R3 located longitudinally above the transmitting antennas T1, T2 and a fourth receiving antenna R4 located longitudinally below the transmitting antennas T1, T2. Receiving antennas R1–R4 are connected to respective receivers RC1–RC4, which are each identical to the receivers discussed above in connection with the embodiment of FIG. 3. Receivers RC1–RC4 provide an output to ADC 30. ADC 30 samples and converts to digital form each of the received signals and outputs a signal reflecting this data to processor 40.

The exemplary embodiment of FIG. 6 also includes phase detectors PD1 and PD2 which respectively receive a 400 KHz signal from oscillator 13 and a 2 MHz signal from oscillator 15. For clarity, the details of phase detectors PD1, PD2 have been omitted in FIG. 6, although it is to be understood that phase detectors PD1 and PD2 include mixer 51, band pass filter 53 and amplifier 55 as illustrated, for example, in the exemplary embodiment of FIG. 3. While FIG. 6 illustrates phase detector PD1 receiving the reference signal from receiver RC3, those skilled in the art will appreciate that the source of the reference signal can alternatively be from receiver RC1, RC2 or RC4 or a separate source independent from the reference signals provided to any of the receivers RC1–RC4. Similarly, while FIG. 6 illustrates phase detector PD2 receiving the reference signal provided from receiver RC4, those skilled in the art will appreciate that the source of this reference signal can alternatively be from receiver RC1, RC2 or RC3 or a source independent from any of the receivers RC1–RC4.

An exemplary operation of the exemplary embodiment of FIG. 6 is similar to that of the exemplary embodiment of FIG. 3. However, the electromagnetic wave transmitted through formation 9 by transmitting antenna T1 or transmitting antenna T2 is received not only by receiving antenna R1 and R2, but also receiving antennas R3 and R4. For example, switches S1 and S2 may be controlled under the command of processor 40 to connect transmitter 11 to transmitting antenna T1 and 400 KHz oscillator 13. All of the switches 230 respectively connected to 400 KHz band pass filters 23 in receivers RC1–RC4 are in a closed state at this time and the switches 250 respectively connected to 2 MHz band pass filters 25 are in an opened state at this time. The 400 KHz electromagnetic wave transmitted from transmitting antenna T1 propagates through the formation and is received by each of receiving antennas R1–R4. The signals detected by receiving antennas R1–R4 are provided to and processed by receivers RC1–RC4, which, in turn, provide outputs for sampling and digital conversion by ADC 30. ADC 30 then provides an output to processor 40, which stores digital data reflecting the signals detected by receiving antennas R1–R4.

Switch S2 is then flipped to connect transmitter 11 to 2 MHz oscillator 15 and switches 230 in receivers RC1–RC4 are opened and switches 250 in receivers RC1–RC4 are closed. Transmitter 11 energizes transmitting antenna T1 to transmit 2 MHz electromagnetic waves. These 2 MHz electromagnetic waves propagate through formation 9 and are detected by each of receiving antennas R1–R4. The signals detected by R1–R4 are processed respectively by receivers RC1–RC4, sampled and digitally converted by ADC 30 and output for storage by processor 40.

Switches S1 and S2 are then flipped so that transmitter 11 is connected to transmitting antenna T2 and 400 KHz oscillator 13. Switches 250 in receivers RC1–RC4 are opened and switches 230 in receivers RC1–RC4 are closed. Transmitter 11 energizes transmitting antenna T2 to transmit a 400 KHz electromagnetic wave through formation 9. The 400 KHz wave is detected by each of receiving antennas R1–R4. The signals detected by receiving antennas R1–R4 are then provided to and processed by receivers RC1–RC4 which provide outputs for sampling and digital conversion by ADC 30. ADC 30 in turn provides an output reflecting the signals detected by receiving antennas R1–R4 to processor 40.

In the last stage of the measuring cycle, switch S2 is flipped so that transmitter 11 is connected to 2 MHz oscillator 15. Switches 250 in receivers RC1–RC4 are closed and switches 230 in receivers RC1–RC4 are opened. Transmitter 11, energizes transmitting antenna T2 to transmit 2 MHz electromagnetic waves through formation 9. These 2 MHz waves are detected by receiving antennas R1–R4. The signals detected by receiving antennas R1–R4 are respectively provided to and processed by receivers RC1–RC4 for sampling and digital conversion by ADC 30. ADC 30, in turn, provides an output signal to processor 40, which stores digital data representing the signals detected by receiving antennas R1–RC4.

Processor 40 calculates the phase and/or amplitude ratio between the following signals: (1) the two 400 KHz signals received by receiving antenna R1 originating from transmitting antennas T1 and T2 respectively, (2) the two 2 MHz signals received by receiving antenna R1 from transmitting antennas T1 and T2, respectively, (3) the two 400 KHz signals received by receiving antenna R2 from transmitting antennas T1 and T2, respectively, (4) the two 2 MHz signals detected by receiving antenna R2 from transmitting antennas T1 and T2, respectively, (5) the two 400 KHz signals received by receiving antenna R3 from transmitting antennas T1 and T2 respectively (6) the two 2 MHz signals received by receiving antenna R3 from transmitting antennas T1 and T2, respectively, (7) the two 400 KHz signals received by receiving antenna R4 from transmitting antennas T1 and T2, respectively, and (8) the two 2 MHz signals received by receiving antenna R4 transmitted from transmitting antennas T1 and T2, respectively.

By increasing the number of receiving antennas from two receiving antennas R1, R2 (as illustrated in the exemplary embodiment of FIG. 3) to four receiving antennas R1–R4, the exemplary embodiment of FIG. 6 is capable of reducing the measurement time to complete a sampling cycle. Stated another way, the exemplary embodiment of FIG. 6 will be able to obtain double the amount of data in the same amount of time as the exemplary embodiment of FIG. 3.

Figure 7:
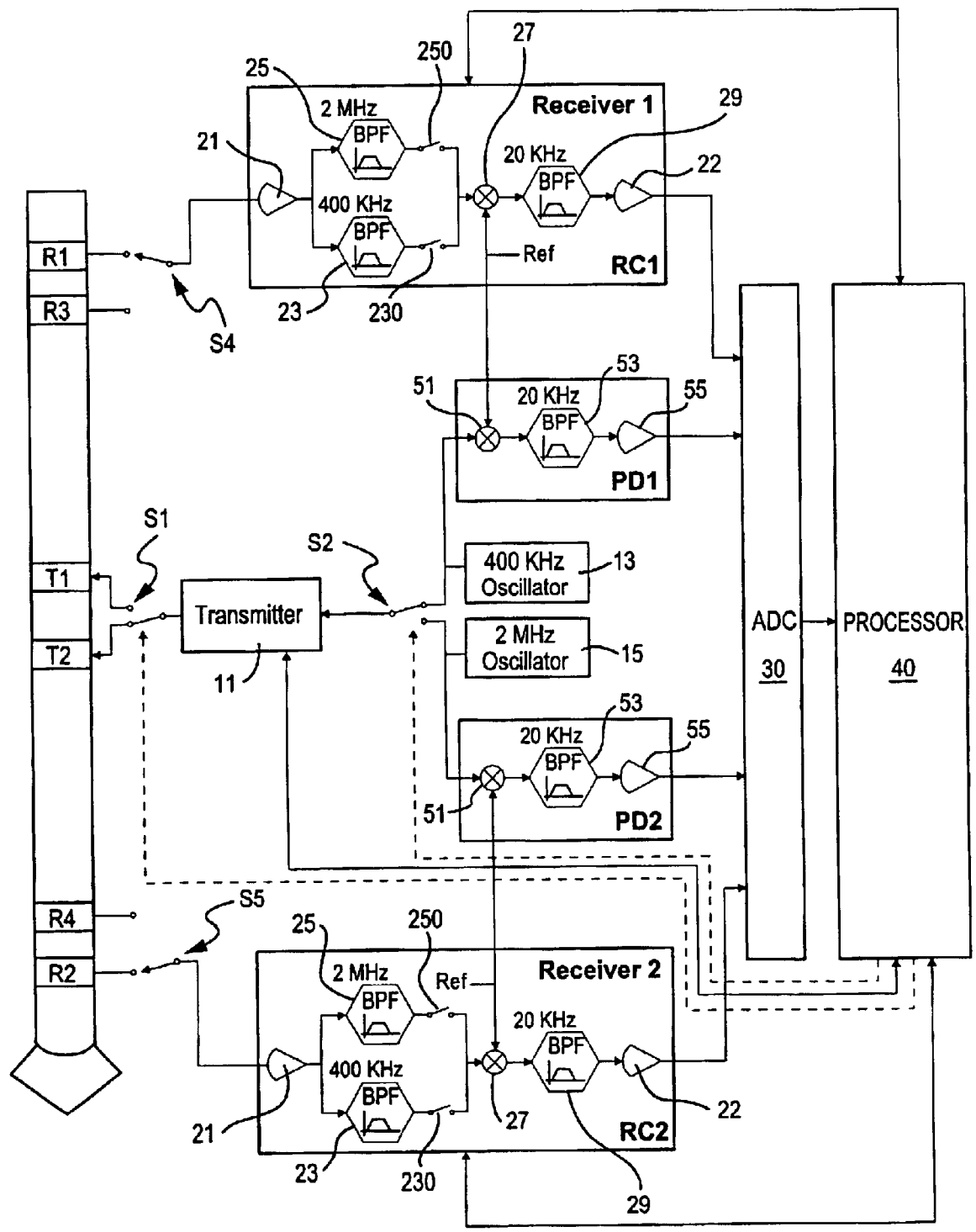
FIG. 7 is a diagram, partially in block form, illustrating the well logging device of FIG. 2B and its associated electronics in which a pair of receiving antennas are alternately connected to a receiver.

Referring now to FIG. 7, another exemplary embodiment of a well logging device in accordance with the present invention includes a pair of upper receiving antennas R1, R3 being alternately connected to receiver RC1 and another pair of lower receiving antennas R2, R4 alternately connected to another receiver RC2. Like the exemplary embodiment of FIG. 6, the exemplary of embodiment of FIG. 7 includes transmitter 11 alternately connected through switch S1 to either transmitting antenna T1 or T2 and either to oscillator 13 or 15 through switch S2.

The transmission cycle of electromagnetic energy from transmitting antennas T1 and T2 is similar to that of FIG. 6. That is, switches S1 and S2 enable transmitter 11 to first transmit a 400 KHz electromagnetic wave from transmitting antenna T1, a 2 MHz electromagnetic wave from the transmitting antenna T1, a 400 KHz electromagnetic wave from transmitting antenna T2, and finally, a 2 MHz electromagnetic wave from transmitting antenna T2. However, as discussed above, the operation of the switches S1 and S2 under the control of processor 40 (present in the exemplary embodiment of FIG. 7, but omitted from the illustration of FIG. 7 for clarity) may alternatively enable the following order of transmission stages: (1) a 400 KHz transmission from transmitting antenna T1, (2) a 400 KHz transmission from transmitting antenna T2, (3) a 2 MHz transmission from transmitting antenna T1, and finally (4) a 2 MHz transmission from transmitting antenna T2. After the first two stages (i.e., after transmissions of 400 KHz signals from transmitting antennas T1 and T2), the processor is capable of calculating phase shift and/or amplitude measurements of signals received at each receiving antenna R1–R4. A formation resistivity may then be determined by processor 40 on the basis of these phase shift and/or amplitude measurements. As a further alternative, the 2 MHz transmissions (successive transmissions from transmitting antennas T1 and T2) may occur before successive transmissions from transmitting antennas T1 and T2 at 400 KHz.

During the 400 KHz transmission from transmitting antenna T1, switch S4 will connect one of the two upper receiving antennas R1, R3 to receiver RC1 and switch S5 will connect one of the two lower receiving antennas R2, R4 to receiver RC2. Switches S4 and S5 are operated under the command of processor 40. The 400 KHz electromagnetic wave propagates from transmitting antenna T1 through formation 9 and is detected by one of the two upper receiving antennas (e.g., receiver antenna R1) connected to receiver RC1 and one of the lower receiving antennas (e.g., receiving antenna R2) connected to receiver RC2. The signals detected by the receiving antennas R1, R2 connected, respectively, to receivers RC1 and RC2 are processed, digitally converted and stored by receivers RC1 and RC2, ADC 30 and processor 40 as discussed above.

After digital representations of the signals detected by receiving antennas R1 and R2 are stored, switch S4 is flipped to connect receiver RC1 to the other upper receiving antenna (i.e., receiving antenna R3) and switch S5 is flipped to connect receiver RC2 to the other lower receiving antenna (i.e., receiving antenna R4). The 400 KHz electromagnetic wave transmitted from transmitting antenna T1 is detected by receiving antennas R3 and R4 are then processed by receivers RC1 and RC2, respectively, sampled and digitally converted by ADC 30, and stored by processor 40. During the time that receivers RC1 and RC2, ADC 30 and processor 40 are processing the signals first detected by receiving antennas R1 and R2, the 400 KHz electromagnetic transmission from transmitting antenna T1 may remain on or may alternatively be turned off temporarily until reception of the signals by receiving antennas R3 and R4 is desired.

Switches S4 and S5 are then set to select receivers R1 and R2, respectively, and switch S1 is set to select transmitting antenna T1. Switch S2 is flipped to allow transmitting antenna T1 to transmit a 2 MHz electromagnetic wave through formation 9. This 2 MHz electromagnetic wave is detected by the upper and lower receiving antennas R1, R2 which are connected to receivers RC1 and RC2, processed by receivers RC1, RC2, sampled and digitally converted by ADC 30 and stored by processor 40. Switches S4 and S5 are then flipped to respectively connect the other upper receiving antenna R3 to receiver RC1 and the other lower receiving antenna R4 to receiver RC2. The 2 MHz signal from transmitting antenna T1 detected by receiving antennas R3 and R4 are then processed by receivers RC1 and RC2, sampled and digitally converted by ADC 30, and stored by processor 40.

Switches S1 and S2 are then configured so that a 400 KHz electromagnetic wave is transmitted from transmitting antenna T2. This 400 KHz electromagnetic wave propagated through formation 9 is detected by receiving antennas R1 and R2 connected respectively through switches S4 and S5 to receivers RC1 and RC2. The 400 KHz electromagnetic waves detected by receiving antennas R1 and R2 are processed by receivers RC1 and RC2, sampled and digitally converted by ADC 30 and stored by processor 40. Switches S4 and S5 are then flipped so that the 400 KHz electromagnetic signal from transmitting antenna T2 is detected by receiving antennas R3 and R4. The electromagnetic waves detected by receiving antennas R3 and R4 are then provided to and processed by receivers RC1, RC2, sampled and digitally converted by ADC 30 and stored by processor 40.

Switches S1 and S2 are then controlled to enable transmitter 11 to transmit a 2 MHz electromagnetic wave from transmitting antenna T2 through formation 9. The 2 MHz electromagnetic wave is detected by receiving antennas R1 and R2, which are connected at that time by switches S4 and S5 to receivers RC1 and RC2, respectively. The 2 MHz signals detected by receiving antennas R1 and R2 are processed by receivers RC1, RC2, sampled and digitally converted by ADC 30 and stored by processor 40. Switches S4 and S5 are then flipped so that receiving antennas R3 and R4 are connected to receivers RC1 and RC2, respectively. The 2 MHz electromagnetic wave transmitted from transmitting antenna T2 is then detected by receiving antennas R3 and R4, processed respectively by receivers RC1, RC2, sampled and digitally converted by ADC 30, and stored by processor 40.

Processor 40 then calculates phase shift and/or amplitude measurements between electromagnetic waves received by each of the receiving antennas R1–R4 at each of the two transmission frequencies (400 KHz and 2 MHz). These calculations may be determined using the outputs of phase detectors PD1, PD2 as discussed above. A compensated measurement of formation resistivity can then be determined by processor 40 on the basis of these phase shift and/or amplitude ratio calculations.

A difference between the exemplary embodiment illustrated in FIG. 6 and the exemplary embodiment illustrated in FIG. 7 is that the exemplary embodiment of FIG. 7 requires two less receivers (i.e., receivers RC3 and RC4 are not utilized in the exemplary embodiment of FIG. 7). The exemplary embodiment of FIG. 7 can therefore minimize the amount of electronics hardware (namely the hardware of receivers RC3 and RC4) and thus minimize the cost to construct the well logging device. Moreover, since the measurements from upper receiving antennas R1 and R3 are processed by the same receiver RC1 and the measurements from lower receiving antennas R2 and R4 are processed by the same receiver RC2 (rather than each receiving antenna having its own associated receiver as in the exemplary embodiment of FIG. 6), the reliability of the measurements may be increased as any errors introduced by the differences between receivers (i.e., the differences between receivers RC1 and RC3 and the differences between receivers RC2 and RC4) can be minimized.

Figure 8:
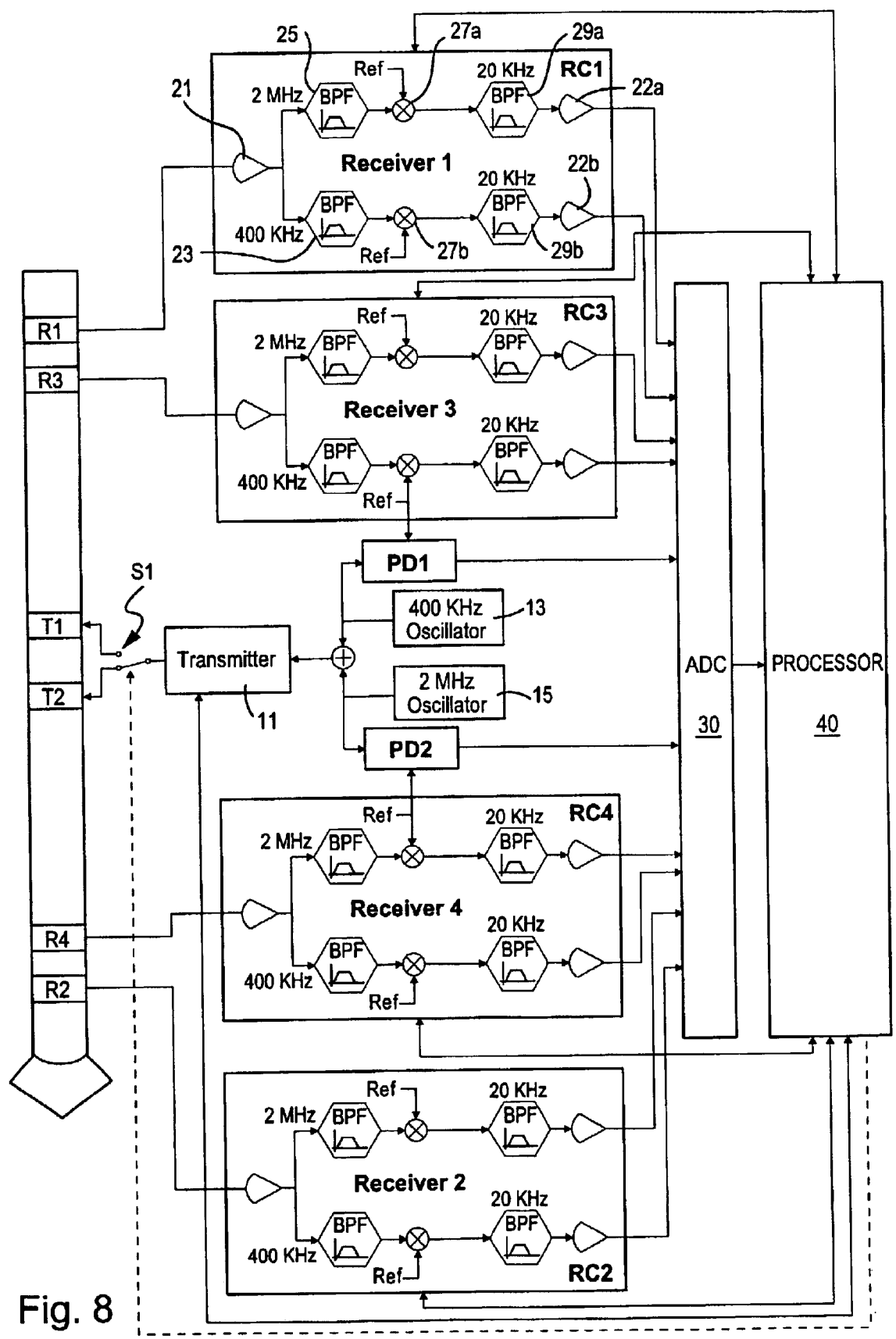
FIG. 8 is a diagram, partially in block form, illustrating the well logging device of FIG. 2B and its associated electronics which enables a transmitting antenna to transmit an electromagnetic wave signal simultaneously having more than one frequency.

Referring now to FIG. 8, an exemplary embodiment of a well logging device in accordance with the present invention includes the antenna configuration of FIG. 2B (two upper receiving antennas R1 and R3, two lower receiving antennas R2 and R4, and transmitting antennas T1 and T2 arranged longitudinally between the pair of upper receiving antennas R1 and R3 and the pair of lower receiving antennas R2 and R4). Similar to the exemplary embodiment of FIG. 4, the exemplary embodiment of FIG. 8 includes a dual frequency design.

In operation, switch S1 is directed by processor 40 to first connect transmitting antenna T1 to transmitter 11. An electromagnetic wave simultaneously having more than one frequency component (e.g., 400 KHz component and 2 MHz component) propagates through formation 9. Receiving antennas R1–R4 each detect the wave transmitted from transmitting antenna T1 at their respective locations. Each of the detected signals from receiving antennas R1–R4 are provided to and processed by receivers RC1–RC4, respectively. Each of the receivers RC1–RC4 provides two outputs to ADC 30 for sampling and digital conversion by ADC 30. One of the outputs reflects processing by each of the receivers RC1–RC4 of a 400 KHz component of the signal received by each of the respective receiving antennas R1–R4 while the other signal output from each of the receivers RC1–RC4 reflects processing of the 2 MHz component of the signal received by respective receiving antennas R1–R4. All of the digitally converted data are stored by processor 40. Phase detectors PD1 and PD2 respectively provide 400 KHz and 2 MHz signals to ADC30 which in turn outputs signals to processor 40 as discussed above.

Switch S1 is then flipped so that transmitting antenna T2 is connected to transmitter 11. Transmitter 11 energizes transmitting antenna T2 so that it transmits an electromagnetic signal simultaneously having more than one frequency component. The frequency components (e.g., 400 KHz and 2 MHz components) of the electromagnetic signal transmitted from transmitting antenna T2 are the same frequency components of the electromagnetic signal transmitted earlier by transmitting antenna T1.

The electromagnetic wave transmitted from transmitting antenna T2 is detected by each of receiving antennas R1–R4. The signals detected by receiving antennas R1–R4 are respectively processed by receivers RC1–RC4 in the same manner that the detected signals resulting from the earlier transmission from transmitting antenna T1 were processed. The outputs from receivers RC1–RC4 are received and digitally converted by ADC 30 which, in turn, provides an output to processor 40 for storage.

Processor 40 calculates the phase shift and/or amplitude ratios between the two 400 KHz components of the signals received by receiving antennas R1–R4 and each of the 2 MHz components of the signals received by each of receiving antennas R1–R4. Formation resistivity may then be determined by processor 40 on the basis of these phase shift and/or amplitude ratio measurements. By combining two frequency components (400 KHz and 2 MHz) into one signal, transmission and simultaneous measurements of both frequency components may be accomplished, thereby reducing measurement time.

Figure 9:
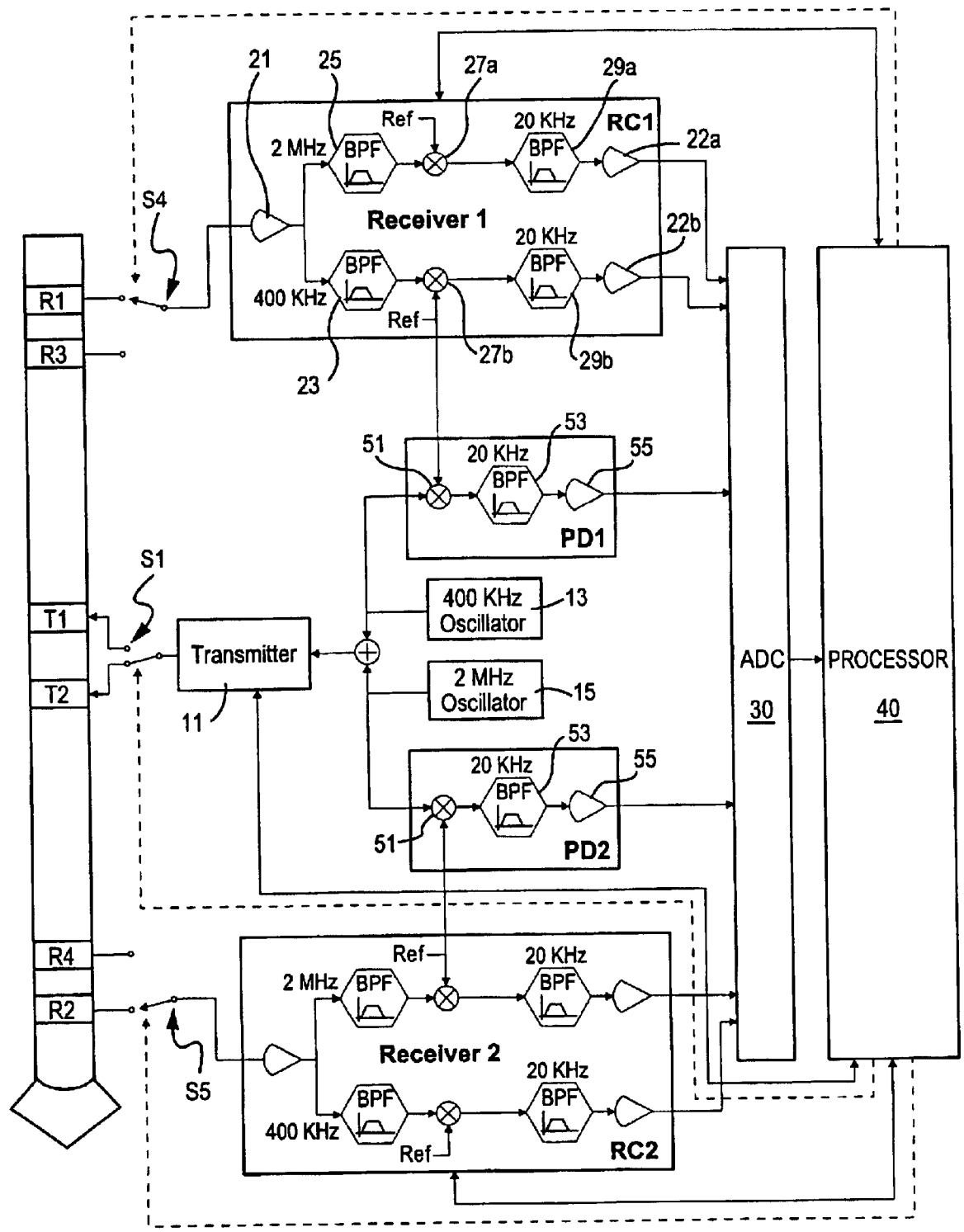
FIG. 9 is a diagram, partially in block form, illustrating the well logging device of FIG. 2B and its associated electronics which enables a transmitting antenna to transmit an electromagnetic wave signal simultaneously having more than one frequency and which enables a pair of receiving antennas to be alternately connected to a receiver.

Referring now to the exemplary embodiment of FIG. 9, a well logging device in accordance with the present invention includes a dual frequency design and the antenna configuration illustrated in FIG. 2B (i.e., two transmitting antennas T1, T2 longitudinally located between two upper receiving antennas R1, R3 and two lower receiving antennas R2, R4). The well logging device also includes switches S4 which alternately connects one of the two upper receiving antennas R1, R3 to receiver RC1 and switch S5 which alternately connects one of receiving antennas R2, R4 to receiver RC2.

In operation, switch S1 connects transmitter 11 to one of transmitting antennas T1 or T2, switch S4 connects receiver RC1 to one of upper receiving antennas R1, R3 and switch S5 connects receiver RC2 to one of lower receiving antennas R2, R4 under the direction of processor 40. For example, the transmitter 11 may energize transmitting antenna T1 to emit an electromagnetic wave that simultaneously contains two frequency components, 400 KHz and 2 MHz. It will be appreciated by those skilled in the art, however, that two other predetermined frequency components having different frequency values may be used. The electromagnetic wave transmitted from transmitting antenna T1 is detected by one of the two receiving antennas (e.g., receiving antenna R1) that is connected to receiver RC1 and one of the two lower receiving antennas (receiving antenna R2) that is connected to receiver RC2. The detected signals are processed by receivers RC1 and RC2, sampled and digitally converted by ADC 30, and stored by processor 40. ADC30 also provides digital data to be stored by processor 40 reflecting outputs from phase detectors PD1 and PD2 which are respectively connected to 400 KHz oscillator 13 and 2 MHz oscillator 15.

Switch S4 is then flipped to connect the other of the upper receiving antennas (receiving antenna R3) to receiver RC1 and switch S5 is flipped to connect the other of the lower receiving antennas (receiving antenna R4) to receiver RC2. The electromagnetic wave transmitted from transmitting antenna T1 is detected by the receiving antennas RC3, RC4 that are now connected to receivers RC1 and RC2, respectively. The detected signals are sampled and digitally converted by ADC 30 and stored by processor 40.

Switches S1, S4 and S5 are then flipped. Accordingly, transmitting antenna T2 transmits an electromagnetic wave having frequency components of 2 MHz and 400 KHz (i.e., the same frequency components as the signal earlier transmitted by transmitting antenna T1). The electromagnetic wave propagates through the formation from transmitting antenna T2 and is detected by one of the two upper receiving antennas (e.g., receiving antenna R1) to which receiver RC1 is connected and one of the two lower receiving antennas (e.g., receiving antenna R2) to which receiver RC2 is connected. The signals detected by receiving antennas R1, R2 are processed by receivers RC1 and RC2, respectively, sampled and digitally converted by ADC 30 and stored by processor 40. Switches S4 and S5 are then flipped to respectively connect receiving antennas R3 and R4 to receivers RC1 and RC2. The electromagnetic wave transmitted from transmitting antenna T2 is then detected by receiving antennas R3 and R4 and processed by receivers RC1 and RC2. The outputs of receivers RC1 and RC2 are sampled and digitally converted by ADC 30 and stored by processor 40.

Processor 40 then calculates the phase shift and/or amplitude ratios between the 400 KHz components of the signals received at each of respective receiving antennas R1–R4, and the phase shift and/or amplitude ratios between 2 MHz frequency components of the signals received at each of respective receiving antennas R1–R4. Processor 40 then calculates a compensated measurement of formation resistivity based on the phase shift and/or amplitude ratio measurements.

Figure 10:
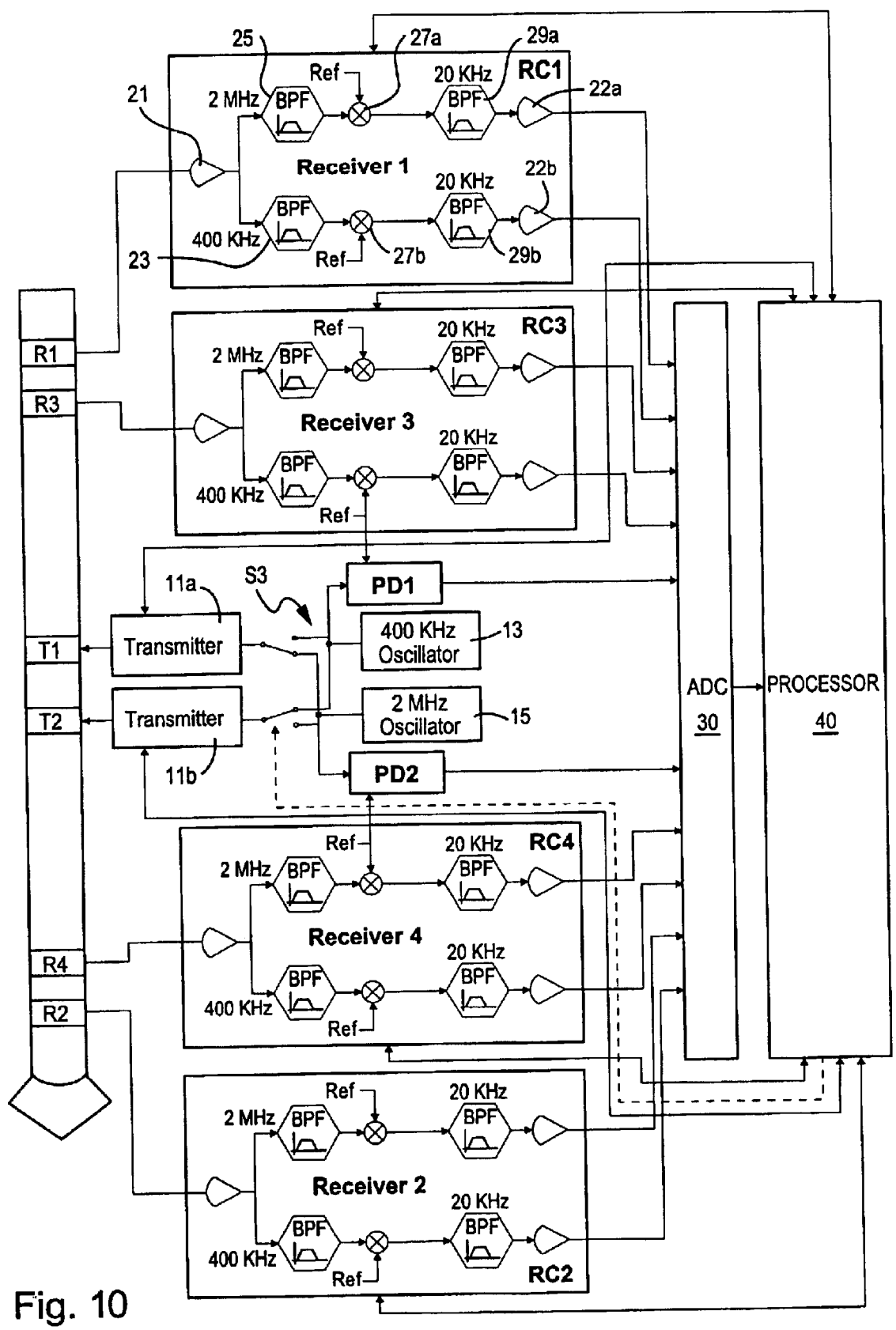
FIG. 10 is a diagram, partially in block form, illustrating the well logging device of FIG. 2B and its associated electronics which enables simultaneous transmission of the electromagnetic wave signals from two different transmitting antennas.

Referring now to FIG. 10, an exemplary embodiment of a well logging device in accordance with the present invention includes a dual transmitter design in which transmitting antennas T1 and T2 are respectively connected to transmitters 11a and 11b. Transmitting antennas T1 and T2 are longitudinally positioned between upper receiving antennas R1, R3 and lower receiving antennas R2, R4. Under the direction of processor 40, switch S3 connects transmitter 11a to one of the oscillators 13, 15 while transmitter 11b is connected to the other of the oscillators 15, 13. Electromagnetic waves are simultaneously transmitted from transmitting antennas T1 and T2 at different frequencies (e.g., 400 KHz and 2 MHz). Oscillators 13 and 15 provide signals through phase detectors PD1, PD2 and ADC30 for storage in processor 40.

In operation, transmitting antenna T1 transmits a 2 MHz electromagnetic wave through formation 9 and at the same time that transmitting antenna T2 transmits a 400 KHz electromagnetic wave through formation 9. The electromagnetic wave, a composite of 400 KHz and 2 MHz, is detected by each of receiving antennas R1–R4. The detected signals are provided to and processed by receivers RC1–RC4. Receivers RC1–RC4 each provide two outputs, one reflecting the processing of the 400 KHz signal received by each of the receiving antennas R1–R4 and the other reflecting the processing of the 2 MHz electromagnetic signal received by each of the receiving antennas R1–R4. The signals output by receivers RC1–RC4 are output to ADC 30, which samples and digitally converts the signals for transmission and storage by processor 40.

Switch S3 is then flipped under the direction of processor 40 so that transmitter 11a energizes transmitting antenna T1 to transmit a 400 KHz electromagnetic wave and transmitter 11b energizes transmitting antenna T2 to transmit a 2 MHz electromagnetic wave. The composite of the 400 KHz electromagnetic wave transmitted from transmitting antenna T1 and the 2 MHz electromagnetic wave transmitted from transmitting antenna T2 is detected by each of receiving antennas R1–R4. The signals detected by receiving antennas R1–R4 are then provided to and processed by receivers RC1–RC4, respectively. Receivers RC1–RC4 each provide two outputs to ADC 30, which samples and digitally converts the received signals and, in turn, provides data to processor 40 for storage.

Processor 40 then calculates the phase shift and/or amplitude ratios between the following signals: (1) the two 400 KHz signals detected by receiving antenna R1, (2) the two 2 MHz signals detected by receiving antenna R1, (3) the two 400 KHz signals detected by receiving antenna R2, (4) the two 2 MHz signals detected by receiving antenna R2, (5) the two 400 KHz signals detected by receiving antenna R3; (6) the two 2 MHz signals detected by receiving antenna R3, (7) the two 400 KHz signals detected by receiving antenna R4, and (8) the two 2 MHz signals detected by receiving antenna R4. Processor 40 then calculates a compensated measurement of resistivity of the formation at a measuring point located between the transmitting antennas T1 and T2 at least two different radial depths of investigation.

Figure 11:
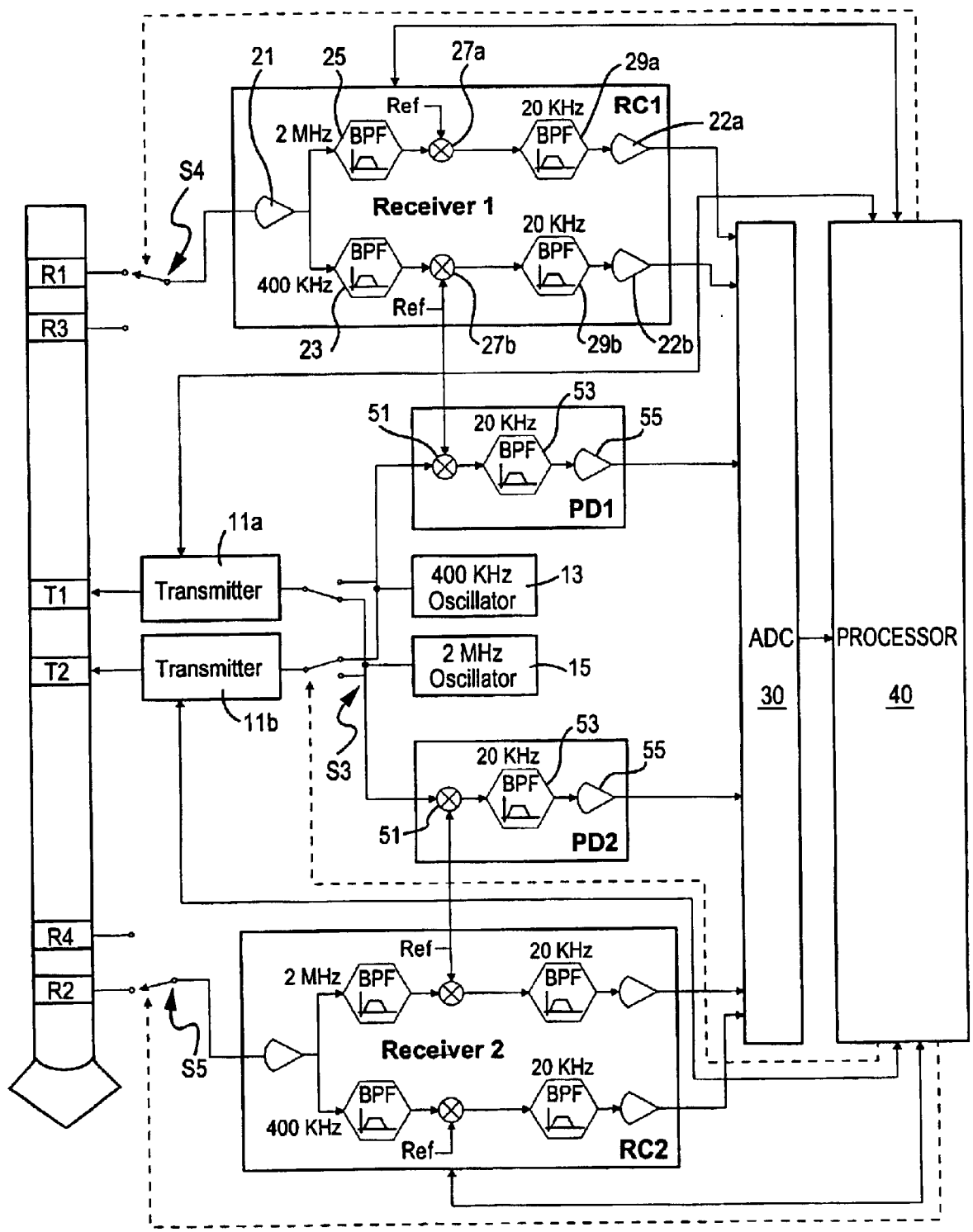
FIG. 11 is a diagram, partially in block form, illustrating the well logging device of FIG. 2B and its associated electronics which enables simultaneous transmission of electromagnetic wave signals from two different transmitting antennas and which enables a pair of receiving antennas to be alternately connected to a single receiver.

Referring now to FIG. 11, a well logging device, in accordance with an exemplary embodiment of the invention, includes a dual transmitter arrangement and a switch which alternately connects a signal receiver RC1 to one of the two upper receiving antennas R1 and R3 and a signal receiver RC2 to one of the two lower receiving antennas R2, R4. The transmission of electromagnetic waves from transmitting antennas T1 and T2 is similar to that discussed in the exemplary embodiment of FIG. 10.

In operation, transmitting antenna T1 transmits a 2 MHz electromagnetic wave at the same time that transmitting antenna T2 transmits a 400 KHz electromagnetic wave. One of the upper receiving antennas R1 and one of the lower receiving antennas R2 are connected through switches S4 and S5, respectively, to receivers RC1 and RC2 to effectively receive and process the 400 KHz and 2 MHz signals. These signals are then sampled and digitally converted by ADC 30 and provided to processor 40 for storage. Switches S4 and S5 are then flipped to connect receiving antennas R3 and R4 to receivers RC1 and RC2, respectively. The composite of the 400 KHz electromagnetic waves transmitted from transmitting antenna T2 and the 2 MHz electromagnetic wave transmitted from transmitting antenna T1 are then detected by receiving antennas R3 and R4 and processed by receivers RC1 and RC2. The outputs of these receivers RC1, RC2 are provided for sampling and digital conversion by ADC 30 and storage by processor 40.

Switches S3, S4 and S5 are then flipped. Transmitter T1 thus transmits a 400 KHz electromagnetic wave and transmitter T2 transmits a 2 MHz electromagnetic wave. The 400 KHz signal and the 2 MHz signal are detected by receiving antennas R1 and R2, processed by receivers RC1 and RC2, sampled and digitally converted by ADC 30 and stored by processor 40. Switches S4 and S5 are then flipped to connect receiving antennas R3 and R4 to receivers RC1 and RC2, respectively. The composite of the 400 KHz electromagnetic wave transmitted from transmitting antenna T1 and the 2 MHz electromagnetic wave transmitted from transmitting antenna T2 are then detected by receiving antennas R3 and R4 and processed by receivers RC1 and RC2, respectively. Outputs from receivers RC1 and RC2 are sampled and digitally converted by ADC 30 and stored by processor 40.

Processor 40 calculates the phase shift and/or amplitude ratios of the two 400 KHz signals received at each of receiving antennas R1–R4 and the two 2 MHz signals received at each of the receiving antennas R1–R4 in a manner similar to that discussed above in connection with the exemplary embodiment of FIG. 10. A compensated measurement of formation resistivity may be calculated by processor 40 based on the phase shift and/or amplitude ratio calculations.

Figure 12:
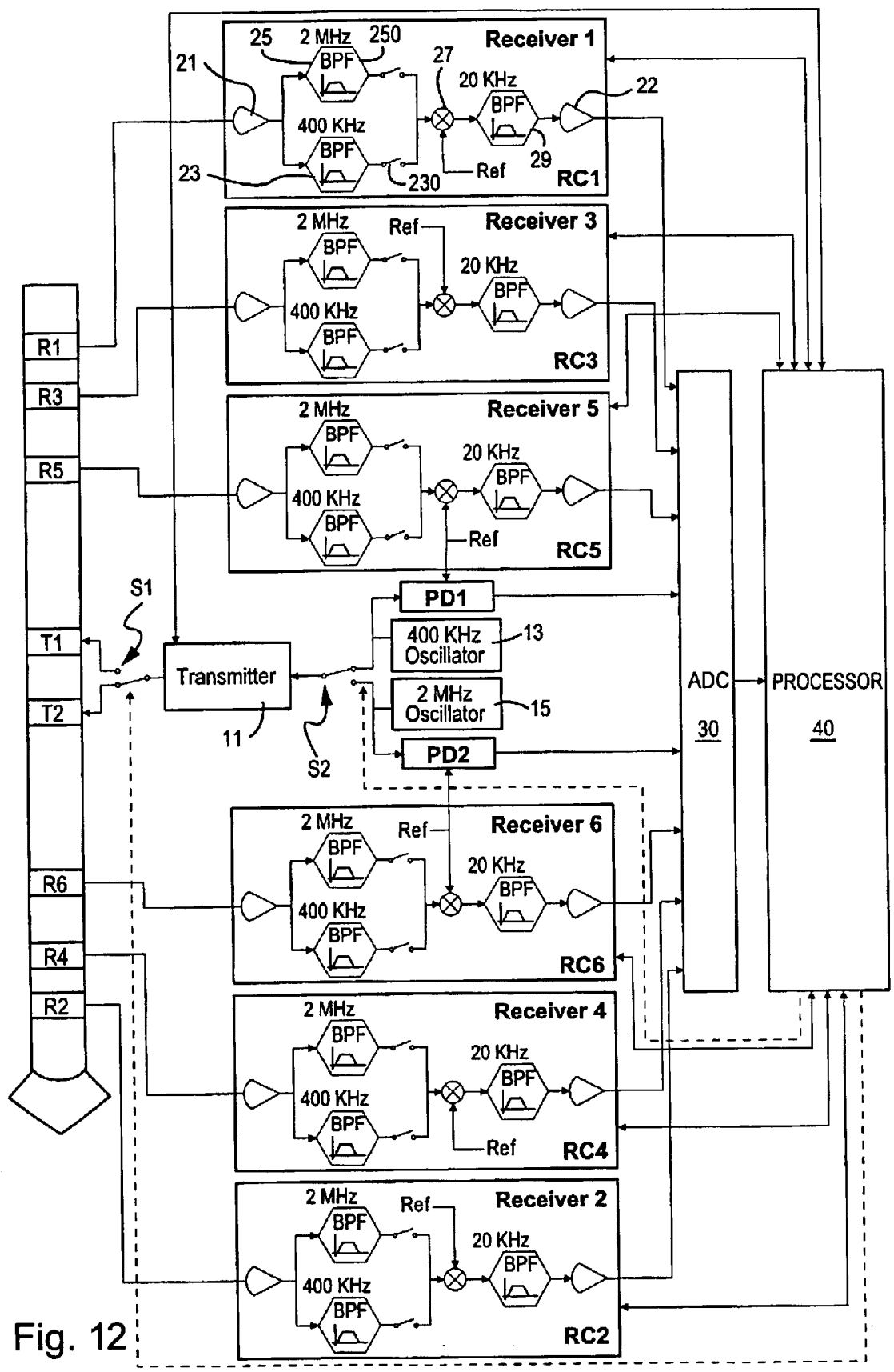
FIG. 12 is a diagram, partially in block form, illustrating the well logging device of FIG. 2C and its associated electronics.

Referring now to FIG. 12, another exemplary embodiment of a well logging device in accordance with the present invention includes the antenna configuration illustrated in FIG. 2C (namely, a pair of transmitting antennas T1 and T2 which have respective longitudinal positions located between three upper receiving antennas R1, R3, R5 and three lower receiving antennas R2, R4, R6). As will be appreciated by those skilled in the art, even additional receiving antennas may be placed above and below the transmitting antennas T1 and T2.

The transmission of electromagnetic waves from transmitter T1 or transmitter T2 is identical to that discussed above in connection with the exemplary embodiment of FIG. 3. Namely, a 400 KHz electromagnetic wave is transmitted from transmitting antenna T1, a 2 MHz electromagnetic wave is transmitted from transmitting antenna T1, a 400 KHz electromagnetic wave is transmitted from transmitting antenna T2, and finally, a 2 MHz electromagnetic wave is transmitted from transmitting antenna T2. These four transmissions (two transmissions from transmitting antenna T1 and two transmissions from transmitting antenna T2) are enabled through switches S1 and S2 under the control of processor 40.

The electromagnetic waves transmitted by transmitting antennas T1 and T2 are detected by receiving antennas R1–R6. By receiving the electromagnetic signals emitted from a transmitting antenna T1 or T2, data regarding the formation at various radial depths of investigation may be obtained in a short amount of time (i.e., using a relatively small number of transmissions from transmitting antennas T1 and T2). Each of the signals detected by receiving antennas R1–R6 are respectively processed by receivers RC1–RC6 in a manner similar to that described above in connection with FIG. 3. ADC 30 receives the outputs from receivers RC1–RC6 to sample and digitally convert these signals and to provide an output representing these signals to processor 40 for storage. After 400 KHz electromagnetic waves have been transmitted by transmitting antenna T1 and T2 and received by each of receiving antennas R1–R6 and 2 MHz electromagnetic signals have been transmitted from transmitting antennas T1 and T2 and received by each of receiving antennas R1–R6 and data suitably processed and stored by receivers RC1–RC6, ADC 30 and processor 40, processor 40 calculates the phase shift and/or amplitude ratios between the following signals: (1) two 400 KHz electromagnetic wave signals detected by receiving antenna R1 from transmitting antennas T1 and T2, respectively, (2) two 2 MHz electromagnetic wave signals detected by receiving antenna R1 from transmitting antennas T1 and T2, respectively, (3) two 400 KHz electromagnetic wave signals detected by receiving antenna R2 from transmitting antennas T1 and T2, (4) two 2 MHz electromagnetic wave signals detected by receiving antenna R2 from transmitting antennas T1 and T2, respectively, (5) two 400 KHz electromagnetic wave signals detected by receiving antenna R3 from transmitting antennas T1 and T2, (6) two 2 MHz electromagnetic wave signals detected by receiving antenna R3 from transmitting antennas T1 and T2, respectively, (7) two 400 KHz electromagnetic wave signals detected by receiving antenna R4 from transmitting antennas T1 and T2, respectively, (8) two 2 MHz electromagnetic wave signals detected by receiving antenna R4 from transmitting antennas T1 and T2, respectively, (9) two 400 KHz electromagnetic wave signals detected receiving antenna R5 from transmitting antennas T1 and T2, respectively, (10) two 2 MHz electromagnetic wave signals detected by receiving antenna R5 from transmitting antennas T1 and T2, respectively, (11) two 400 KHz electromagnetic wave signals detected by receiving antenna R6 transmitted from transmitting antennas T1 and T2, respectively, and (12) two 2 MHz electromagnetic wave signals detected by receiving antenna R6 from transmitting antennas T1 and T2, respectively. Formation resistivity may then be calculated by processor 40 at a measuring point of the formation between transmitting antennas T1 and T2. As noted above, by increasing the number of receiving antennas, the amount of time the transmitter must be active can be reduced thereby shortening the measurement cycle.

Figure 13:
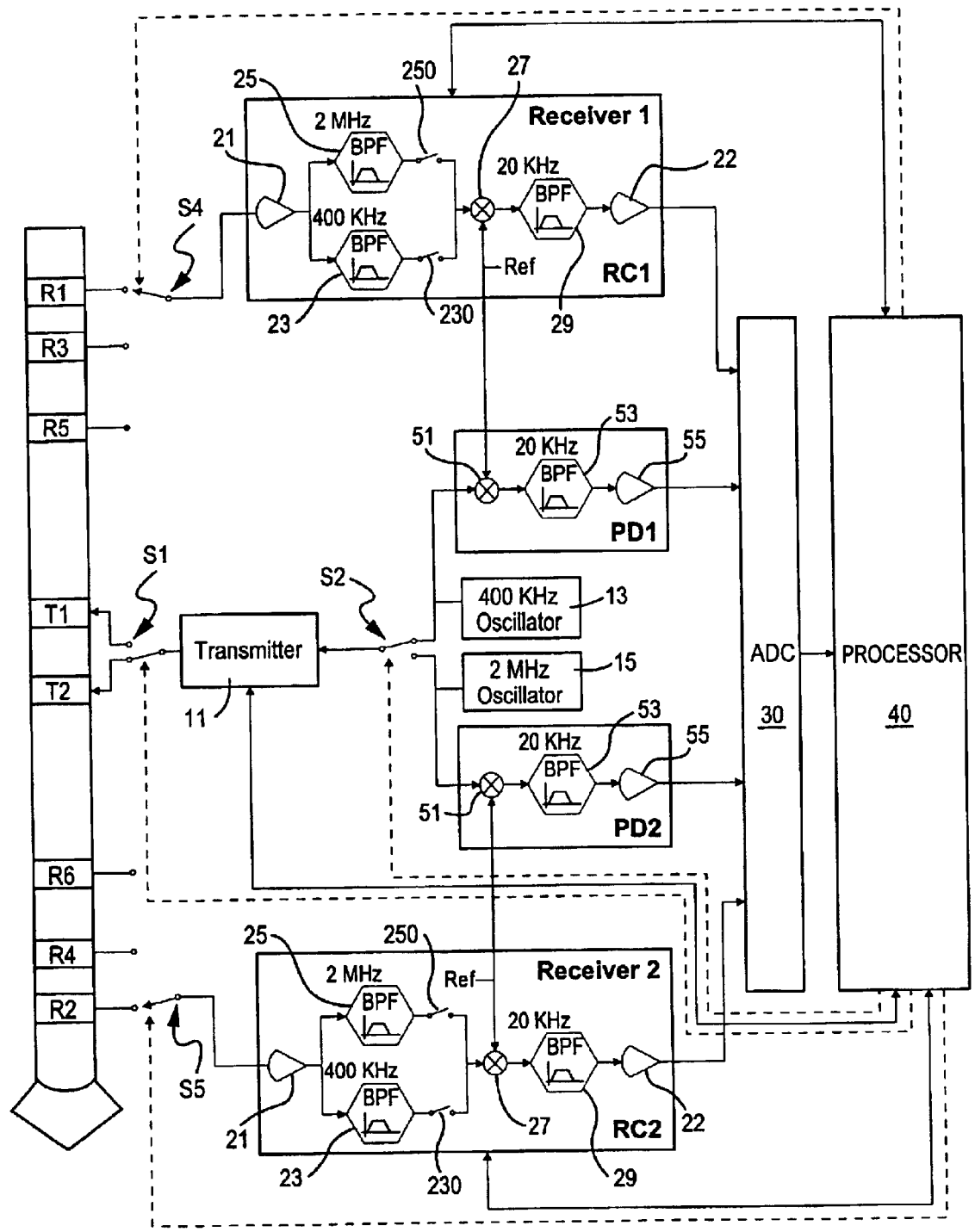
FIG. 13 is a diagram, partially in block form, illustrating the well logging device of FIG. 2C and its associated electronics which enables multiple receiving antennas to be alternately connected to a single receiver.

Referring now to FIG. 13, an exemplary embodiment of the well logging device in accordance with the present invention includes two transmitting antennas T1 and T2 having respective longitudinal positions between three upper receiving antennas R1, R3 and R5 and three lower receiving antennas R2, R4 and R6. The transmissions of electromagnetic signals from transmitting antennas T1 and T2 are essentially the same as that described in connection with the exemplary embodiment of FIG. 3. Namely, a 400 KHz electromagnetic wave is transmitted from transmitting antenna T1, a 2 MHz electromagnetic wave is transmitted from transmitting antenna T1, a 400 KHz electromagnetic wave is transmitted from transmitting antenna T2, and finally, a 2 MHz electromagnetic wave is transmitted from transmitting antenna T2. While transmitting antenna T1 transmits a 400 KHz electromagnetic wave, one of the three upper receiving antennas (e.g., receiving antenna R1) and one of the lower receiving antennas (e.g., receiving antenna R2) are connected to receivers RC1 and RC2, respectively, at a time. The detected signals are then processed by receivers RC1, RC2, digitally converted by ADC 30 and stored by processor 40. Switch S4 then connects receiver RC1 to another one of the upper receiving antennas (e.g., receiving antenna R3) and switch S5 connects receiver RC2 to another one of the lower receiving antennas (e.g., receiving antenna R4). The 400 KHz electromagnetic wave transmitted from transmitter T1 is then detected by the upper and lower receiving antennas R3 and R4 connected to receivers RC1 and RC2, respectively, for processing, conversion and storage by processor 40.

Switch S4 is flipped to connect the remaining upper receiving antenna (e.g., receiving antenna R5) to the receiver RC1 and switch S5 is flipped to connect the remaining lower receiving antenna (e.g., receiving antenna R6) to receiver RC2. The 400 KHz electromagnetic wave transmitted from transmitting antenna T1 is then detected by the upper and lower receiving antennas R5, R6 that are connected to receivers RC1 and RC2, respectively. The signals output from receivers RC1 and RC2 are sampled and digitally converted by ADC 30, and stored by processor 40.

The above operation in which switch S4 connects receiver RC1 to each of receiving antennas R1, R3 and R5 (one at time) and switch S5 connects receiver RC2 to one of lower receiving antennas R2, R4 and R6 (one at time) is repeated for each of the two remaining data acquisition stages ((1) transmitting 2 MHz electromagnetic waves from transmitting antenna T1, (2) KHz transmitting 2 MHz electromagnetic waves from transmitting antenna T2). After collecting and storing all of the collected data, processor 40 can calculate phase shift and/or amplitude ratios between 400 KHz signals at each of the receiving antennas R1–R6 and phase shifting and/or amplitude ratios for 2 MHz signals received at each of the receiving antennas R1–R6. A compensated measure of formation resistivity at a measuring point between transmitting antennas T1 and T2 may be then calculated based on the phase shift and/or amplitude ratio measurements.

It will be appreciated by those skilled in the art that any one of the three upper receiving antennas R1, R3 or R5 may be connected to receiver RC1 simultaneously when any one of the lower three receiving antennas R2, R4 or R6 is connected to receiver RC2, RC4 or RC6. For example, receiving antennas R1 and R6 may be simultaneously connected to receivers RC1 and RC2, respectively for receiving electromagnetic waves.

Figure 14:
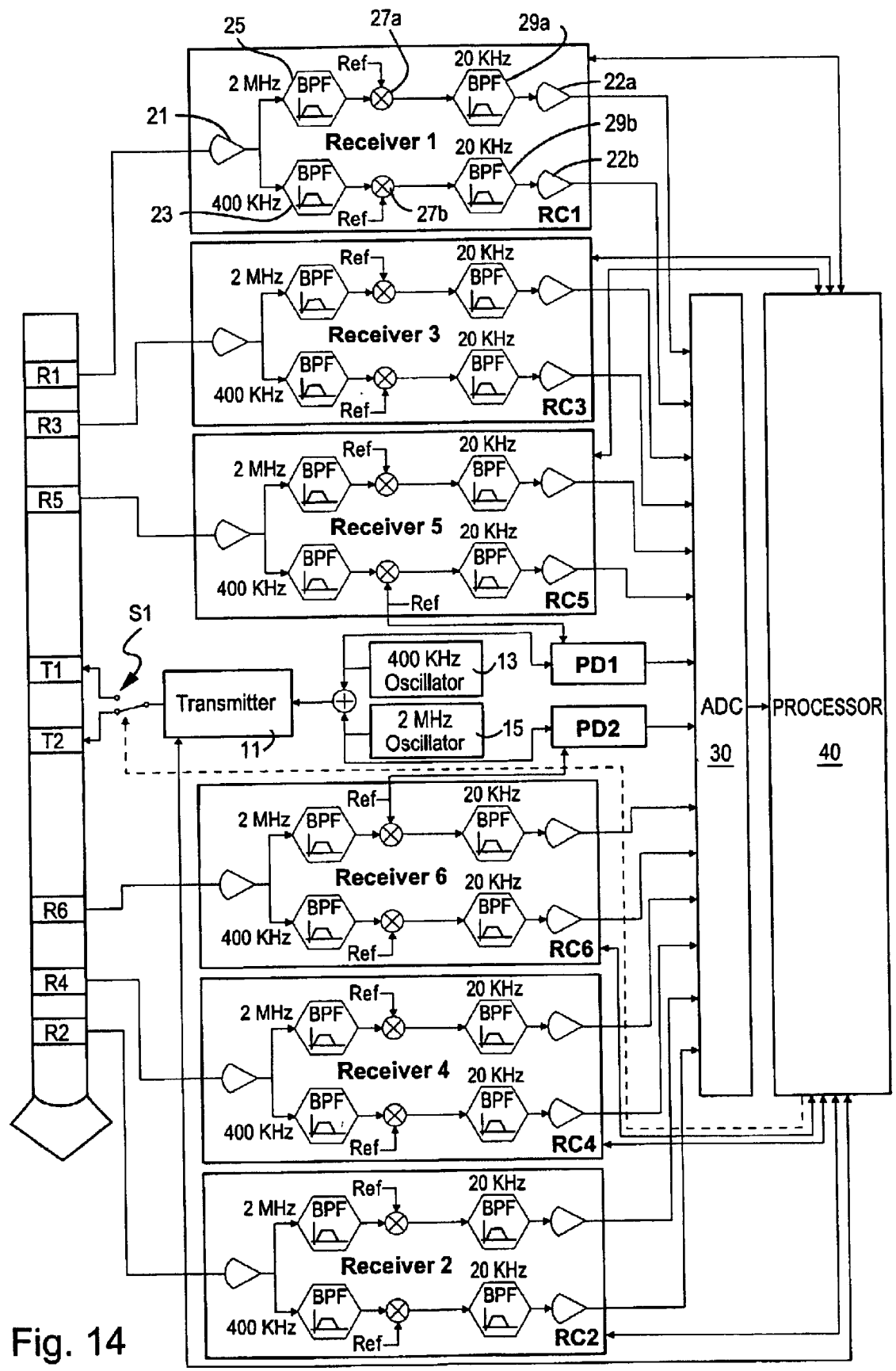
FIG. 14 is a diagram, partially in block form, illustrating the well logging device of FIG. 2C and its associated electronics which enables transmission of an electromagnetic wave signal simultaneously having more than one frequency from the same transmitting antenna.

Referring now to FIG. 14, another exemplary embodiment of a well logging device in accordance with the present invention includes a pair of transmitting antennas T1 and T2, which are operated in a dual frequency fashion, located between three upper receiving antennas R1, R3, R5 and three lower receiving antennas R2, R4 and R6. The transmission of electromagnetic waves from transmitting antennas T1 and T2 is the same as that described in connection with the exemplary embodiment of FIG. 4. Namely, transmitting antenna T1 transmits an electromagnetic wave having two different frequency components (e.g., 400 KHz and 2 MHz). Transmitting antenna T2 then transmits an electromagnetic wave having those same frequency components.

The electromagnetic wave transmitted from transmitting antenna T1 is detected by each of receiving antennas R1–R6 for processing through respective receivers RC1–RC6, digital conversion by ADC 30, and storage by processor 40 as discussed above. The electromagnetic wave transmitted from transmitting antenna T2 is detected by each of receiving antennas R1–R6 for processing by respective receivers RC1–RC6, digital conversion by ADC 30, and storage by processor 40.

Processor 40 can then calculate the phase shift and/or amplitude ratio between the two 400 KHz signals detected by each of the receiving antennas R1–R6, and the phase shift and/or amplitude ratio between the two 2 MHz signals detected by each of the receiving antennas R1–R6. A compensated measure of formation resistivity may then be calculated for a measuring point in the formation between the upper and lower receiving antennas and between transmitting antennas T1 and T2.

Figure 15:
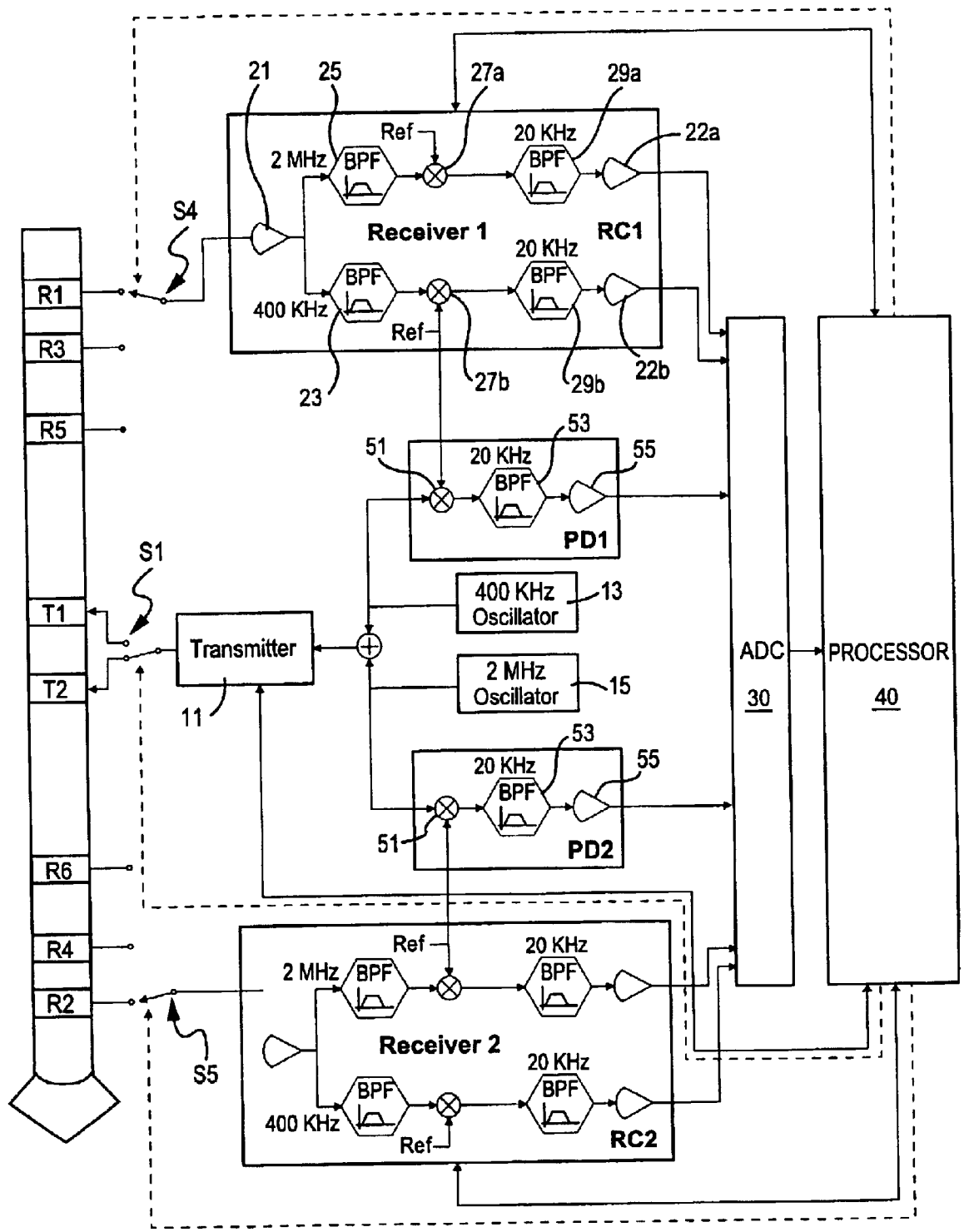
FIG. 15 is a diagram, partially in block form, illustrating the well logging device of FIG. 2C and its associated electronics which enables transmission of an electromagnetic wave signal simultaneously having more than one frequency from the same transmitting antenna and which enables multiple receiving antennas to be alternately connected to a single receiver.

Referring now to FIG. 15, another exemplary embodiment of a well logging device in accordance with the present invention includes the antenna configuration illustrated in FIG. 2C. Namely, the well logging device includes a pair of transmitting antennas T1, T2 having respective longitudinal locations between upper receiving antennas R1, R3, R5 and lower receiving antennas R2, R4, R6. The electromagnetic energy transmissions from transmitting antennas T1 and T2 are similar to that discussed in the exemplary embodiment of FIG. 4. Namely, an electromagnetic wave transmitted from transmitting antenna T1 includes at least two different frequency components (e.g., 400 KHz and 2 MHz frequencies) and then, an electromagnetic wave transmitted from transmitting antenna T2 includes the same frequency components.

The electromagnetic wave transmitted from transmitting antenna T1 is detected by one of the three upper receiving antennas (e.g., receiving antenna R1) and one of the three lower receiving antennas (e.g., receiving antenna R2). These detected signals are then processed in a manner similar to that described in an exemplary embodiment of FIG. 4. After the processing of the signals detected by receiving antennas R1, R2 is complete, switches S4 and S5 then connect receivers RC1 and RC2, respectively, to another one of the upper receiving antennas (e.g., receiving antenna R3) and another one of the lower receiving antennas (e.g., receiving antenna R4). An electromagnetic wave transmitted from transmitting antenna T1 is detected at receiving antennas R3 and R4 and processed by receivers RC1, RC2, digitally converted by ADC 30, and stored by processor 40.

Switches S4 and S5 are again flipped to connect receivers RC1 and RC2 to the remaining upper receiving antenna (receiving antenna R5) and the remaining lower receiving antenna (receiving antenna R6). The signals detected by receiving antennas R5 and R6 due to transmission of an electromagnetic wave from transmitting antenna T1 are then processed, converted and stored by receivers RC1, RC2, ADC 30 and processor 40 in the manner discussed above.

The above steps described in connection with the electromagnetic wave transmitted from transmitting antenna T1 are then repeated for an electromagnetic wave transmitted from transmitting antenna T2. Namely, an electromagnetic wave transmitted from transmitting antenna T2 is detected by one of the upper receiving antennas (e.g., receiving antenna R1) and one of the three lower receiving antennas (e.g., receiving antenna R2) and then processed by receivers RC1, RC2, digitally converted by ADC 30, and stored by processor 40. Switches S4 and S5 are then flipped to connect another of the upper receiving antennas (e.g., receiving antenna R3) and another of the lower receiving antennas (e.g., receiving antenna R4) to receivers RC1 and RC2, respectively. The electromagnetic wave from transmitting antenna T2 is detected by receiving antennas R3, R4, and then processed, converted and stored by receivers RC1, RC2, ADC 30 and processor 40. Switches S4 and S5 are again flipped to connect the remaining upper and lower receiving antennas R5, R6 to receivers RC1 and RC2, respectively. The electromagnetic wave from transmitting antenna T2 is detected by receiving antennas R5, R6 and then processed, digitally converted and stored by receivers RC1, RC2, ADC 30 and processor 40.

Processor 40 calculates the phase shift and/or amplitude ratio of the two 400 KHz signal components received by each of receiving antennas R1–R6 and the phase shift and/or amplitude ratio of the two 2 MHz signal components received by each of receiving antennas R1–R6. Processor 40 then calculates a compensated measurement of formation resistivity at two or more radial depths of investigation at a measuring point located between transmitting antennas T1, T2.

Figure 16:
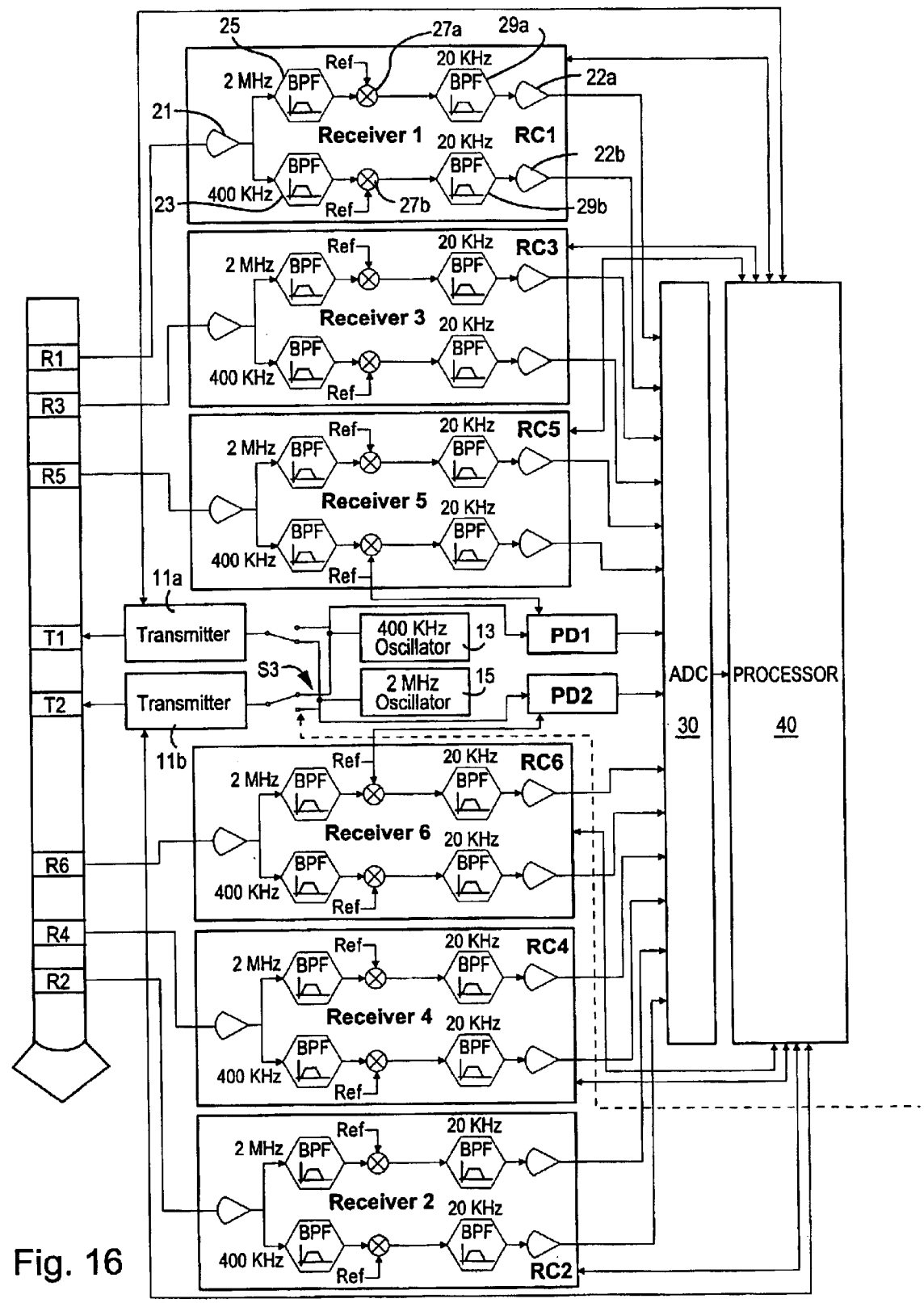
FIG. 16 is a diagram, partially in block form, illustrating the well logging device of FIG. 2C and its associated electronics which enables simultaneous transmission of electromagnetic wave signals from two different transmitting antennas.

Referring now to FIG. 16, another exemplary embodiment of a well logging device in accordance with the present invention includes the antenna configuration illustrated in FIG. 2C and incorporates a dual transmitter design for simultaneously transmitting electromagnetic electromagnetic waves from two different transmitting antennas T1, T2. The transmissions of electromagnetic energy from transmitters T1, T2 are identical to that described in connection with the exemplary embodiment of FIG. 5. Namely, transmitting antennas T1 and T2 simultaneously transmit electromagnetic signals having different frequencies. Receivers RC1–RC6 are identical to those described in connection with the exemplary embodiments of FIGS. 4–5.

In operation, a 400 KHz electromagnetic wave transmitted from transmitting antenna T2 and a 2 MHz electromagnetic wave simultaneously transmitted from transmitting antenna T1 are detected by each receiving antenna R1–R6 after propagating through formation 9. The signal detected by receiving antennas R1–R6 are processed by receivers RC1–RC6, respectively, digitally converted by ADC 30, and stored by processor 40. After switch S3 is flipped under the command of processor 40, a 400 KHz electromagnetic wave transmitted from transmitting antenna T1 and a 2 MHz electromagnetic wave transmitted from transmitting antenna T2 are detected by each receiving antenna R1–R6 after propagating through formation 9. The signals detected by receiving antennas R1–R6 are processed by receivers RC1–RC6, respectively, digitally converted by ADC 30 and stored by processor 40. Processor 40 then calculates the phase shift and/or amplitude ratio between the two 400 KHz signals received at each of the receiving antennas R1–R6 and the phase shift and/or amplitude ratio between the two 2 MHz signals received by each of the receiving antennas R1–R6. Processor 40 then calculates a compensated measurement of formation resistivity at a measuring point between the two transmitting antennas T1, T2 at one or more radial depths of investigation based on the phase shift and/or amplitude ratio calculations.

Figure 17:
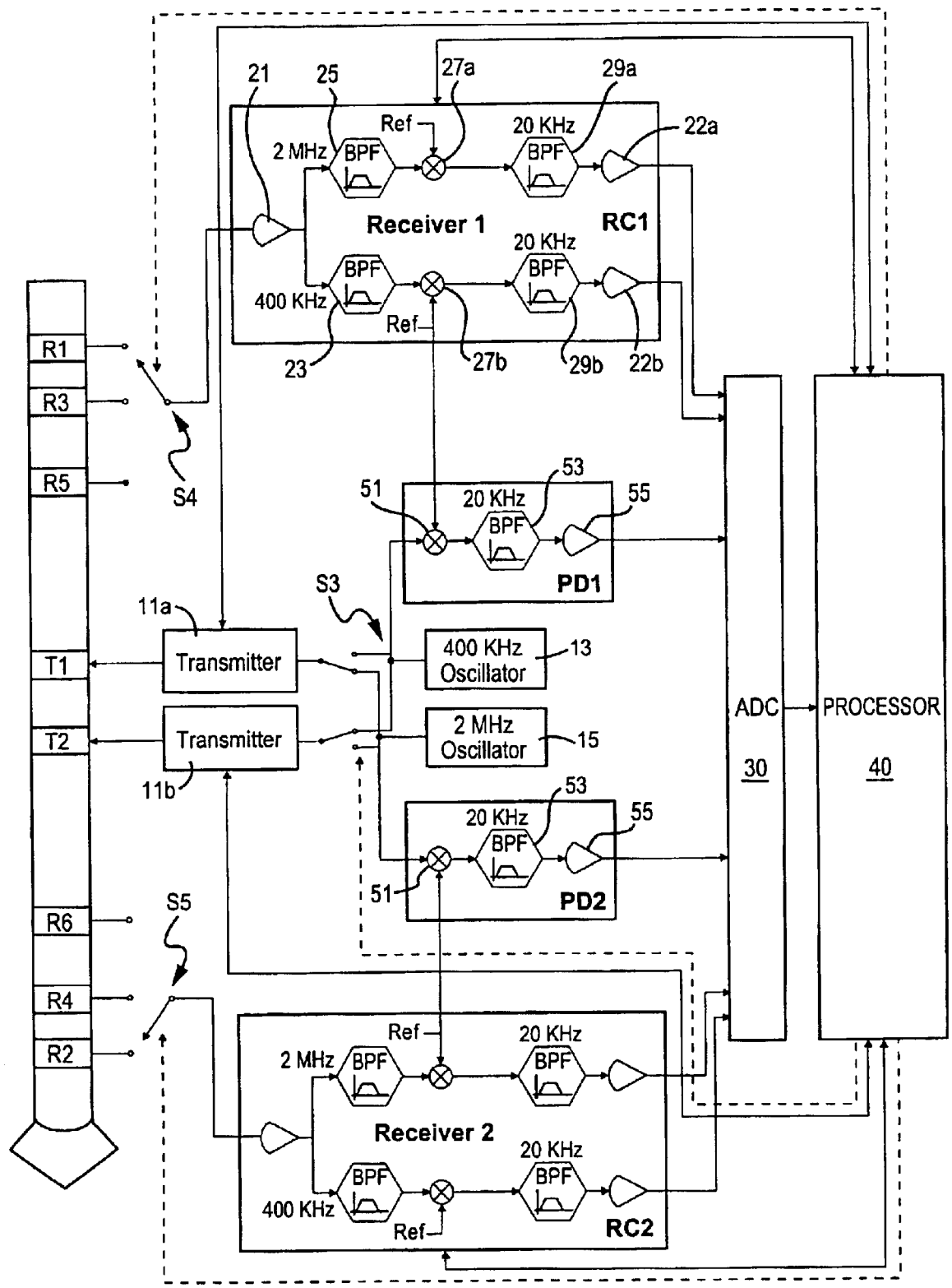
FIG. 17 is a diagram, partially in block form, illustrating the well logging device of FIG. 2C and its associated electronics which enables simultaneous transmission of electromagnetic wave signals from two different transmitting antennas and which enables multiple receiving antennas to be alternately connected to a single receiver.

Referring now to FIG. 17, another exemplary embodiment of a well logging device in accordance with the present invention includes the antenna configuration illustrated in FIG. 2C and implements dual transmitters and dual receivers which may be alternately connected to one of a plurality of receiving antennas (e.g., RC1 may be operatively connected to R1, R3, or R5 while RC2 may be operatively connected to R2, R4, or R6). The transmission of electromagnetic energy from transmitters T1 and T2 is similar to that discussed in connection with the exemplary embodiment of FIG. 5.

In operation, the 400 KHz electromagnetic wave transmitted from transmitting antenna T2 and the 2 MHz electromagnetic wave transmitted from transmitting antenna T1 are first detected by one of the upper three receiving antennas (e.g., receiving antenna R1) that is connected via switch S4 to receiver RC1 and one of the lower three receiving antennas (e.g., receiving antenna R2) that is connected via switch S5 to receiver RC2. The signals detected by receiving antennas R1, R2 are processed, digitally converted and stored as described above. Switches S4 and S5 are switched to connect other receiving antennas (receiving antennas R3 and R4) to receivers RC1 and RC2, respectively. The signals detected by receiving antennas R3 and R4 are processed by receivers RC1 and RC2, respectively, digitally converted by ADC 30 and stored by processor 40. Switches S4 and S5 are again flipped to connect the remaining upper and lower receiving antennas R5 and R6 to receivers RC1 and RC2, respectively. Signals detected by receiving antennas R5 and R6 are processed by receivers RC1 and RC2, respectively, digitally converted by ADC 30 and stored by processor 40.

Switch S3 is then flipped so that a 400 KHz electromagnetic wave is transmitted from transmitting antenna T1 and a 2 MHz electromagnetic wave is transmitted from transmitting antenna T2. The composite of the transmitted electromagnetic waves is detected by the one of the upper three transmitters (e.g., receiving antenna R1) that is connected to receiver RC1 and one of the three lower receiving antennas (e.g., receiving antenna R2) that is connected to receiver RC2. As discussed above, the signals detected by receiving antennas R1, R2 are processed by receivers RC1, RC2, digitally converted by ADC 30, and stored by processor 40. These steps are repeated after switch S4 connects a different one of the three upper receiving antennas (e.g., receiving antenna R3) to receiver RC1 and switch S5 connects another one of the three lower receiving antennas (e.g., receiving antenna R3) to receiver RC2. After these signals have been detected by receiving antennas R3, R4, processed, digitally converted and stored, switch S4 is flipped to connect the remaining one of the upper receiving antennas (e.g., receiving antenna R5) to receiver RC1 and switch S5 is flipped to connect the remaining one of the lower receiving antennas (e.g., receiving antenna R6) to receiver RC2. The signals detected by receiving antennas R5, R6 are processed by receivers RC1 and RC2, respectively, digitally converted by ADC 30 and stored by processor 40. Processor 40 then calculates the phase shift and/or amplitude ratio between the two 400 KHz signals received by each of the receiving antennas R1–R6, and the phase shift and/or amplitude ratio between the two 2 MHz signals received by each of the receiving antennas R1–R6. Based on these phase shift and/or amplitude ratio calculations, processor 40 determines a compensated measurement of formation resistivity at two or more radial depths of investigation at a measuring point between the transmitting antennas T1, T2.

Figure 18:
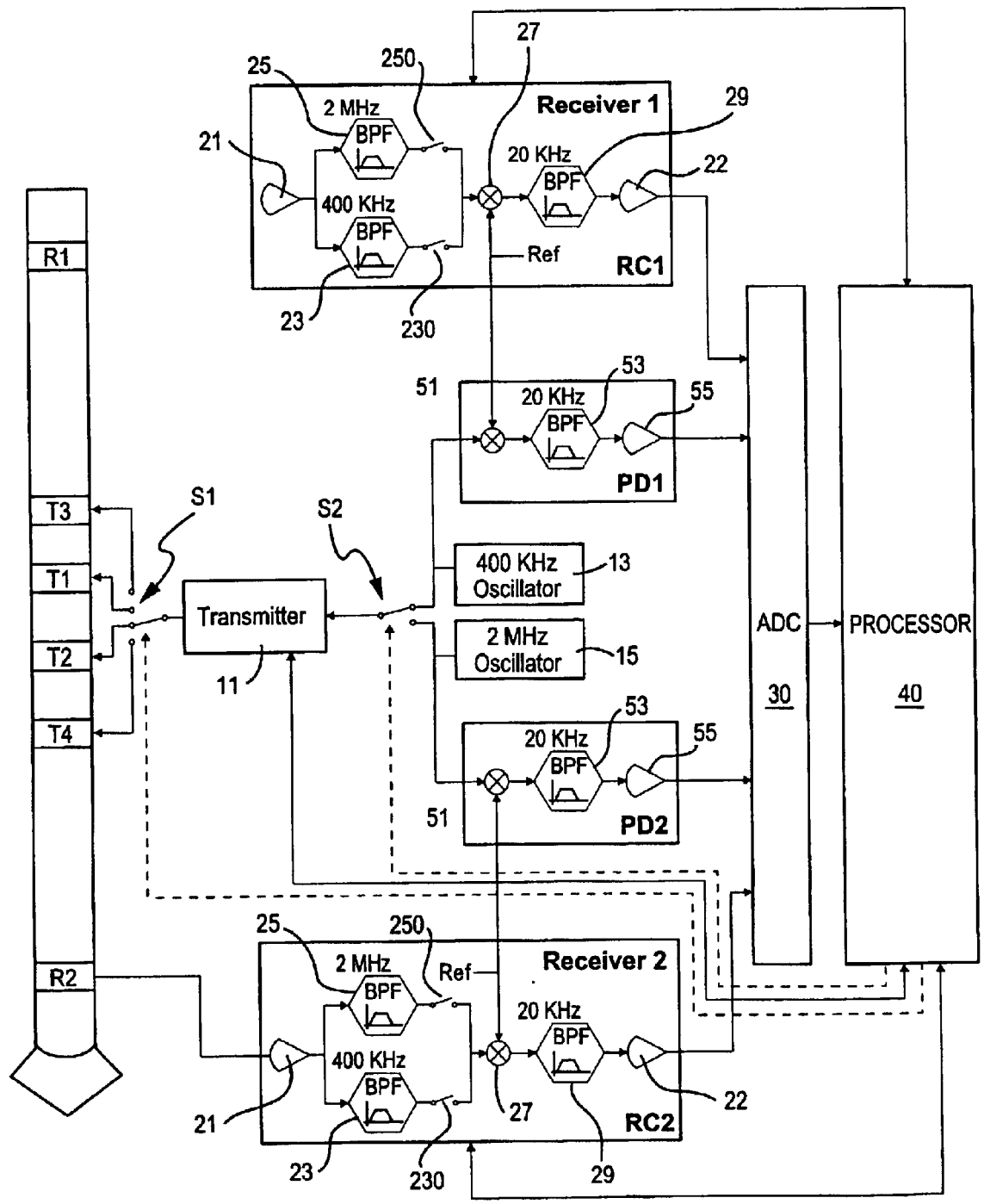
FIG. 18 is a diagram, partially in block form, illustrating the well logging device of FIG. 2D and its associated electronics.

Referring now to FIG. 18, another exemplary embodiment of a well logging device in accordance with the present invention includes the antenna configuration illustrated in FIG. 2D. Namely, the exemplary embodiment of FIG. 18 includes four transmitting antennas T1–T4 having respective longitudinal positions located between an upper receiving antenna R1 and a lower receiving antenna R2. By arranging four (or more) transmitting antennas at respective longitudinal locations, various depths of investigation may be obtained. The receiving antennas R1 and R2 and receivers RC1 and RC2 are identical to those discussed in connection with the exemplary embodiment of FIG. 3.

In operation, electromagnetic waves transmitted from any one of the four transmitting antennas T1–T4 are detected by receiving antennas R1, R2 as discussed above in connection with the exemplary embodiment of FIG. 3. The transmission of electromagnetic energy from transmitting antennas T1–T4 can be accomplished through the appropriate connections defined by switches S1 and S2 under the direction of processor 40. In particular, switches S1 and S2 may be configured to transmit electromagnetic signals for detection by receiving antennas R1, R2, processing by receivers RC1, RC2, digital conversion by ADC 30, and storage by processor 40 as follows: (1) transmitting antenna T1 transmits a 400 KHz signal, (2) transmitting antenna T1 transmits a 2 MHz signal, (3) transmitting antenna T2 transmits a 400 KHz signal, (4) transmitting antenna T2 transmits a 2 MHz signal, (5) transmitting antenna T3 transmits a 400 KHz signal, (6) transmitting antenna T3 transmits a 2 MHz signal, (7) transmitting antenna T4 transmits a 400 KHz signal, and finally (8) transmitting antenna T4 transmits a 2 MHz signal. Each of these transmissions is detected by receiving antennas R1, R2 after the electromagnetic wave propagates through formation 9. As those skilled in the art will appreciate, the above stages of transmission may be changed as desired through the switching of switches S1, S2. For example, the transmission from transmitting antennas T1–T4 can be configured by switches S1 and S2 under the direction of processor 40 to transmit electromagnetic energy as follows: (1) transmitting antenna T1 transmits a 400 KHz signal, (2) transmitting antenna T2 transmits a 400 KHz signal, (3) transmitting antenna T3 transmits a 400 KHz signal, (4) transmitting antenna T4 transmits a 400 KHz signal, (5) transmitting antenna T1 transmits a 200 MHz signal, (6) transmitting antenna T2 transmits a 200 MHz signal, (7) transmitting antenna T3 transmits a 200 MHz signal, and finally, (8) transmitting antenna T4 transmits a 200 MHz signal.

After the transmitting stages and corresponding data reception, processing, digital conversion and storage have been completed, processor 40 calculates the phase shift and/or amplitude ratio between two or more of the 400 KHz signals received by receiver antenna R1 and the phase shift and/or amplitude ratio of two or more 2 MHz signals received by receiving antenna R2. For example, processor 40 may determine the phase shift and/or amplitude ratio between the following: (1) the two 400 KHz signals received by receiving antenna R1 from transmitting antennas T1 and T2, (2) the two 400 KHz signals received by receiving antenna R1 from transmitting antennas T3 and T4, (3) the two 400 KHz signals received by receiving antenna R2 from transmitting antennas T1 and T2, and (4) the two 400 KHz signals received by receiving antenna R2 from transmitting antennas T3 and T4. Also, corresponding phase shift and/or amplitude ratio calculations may be conducted for the 2 MHz signals received by each of receiving antennas R1 and R2. Processor 40 then determines a compensated measurement of formation resistivity at a measuring point between the upper transmitting antennas T1, T3 and the lower transmitting antennas T2, T4.

Figure 19:
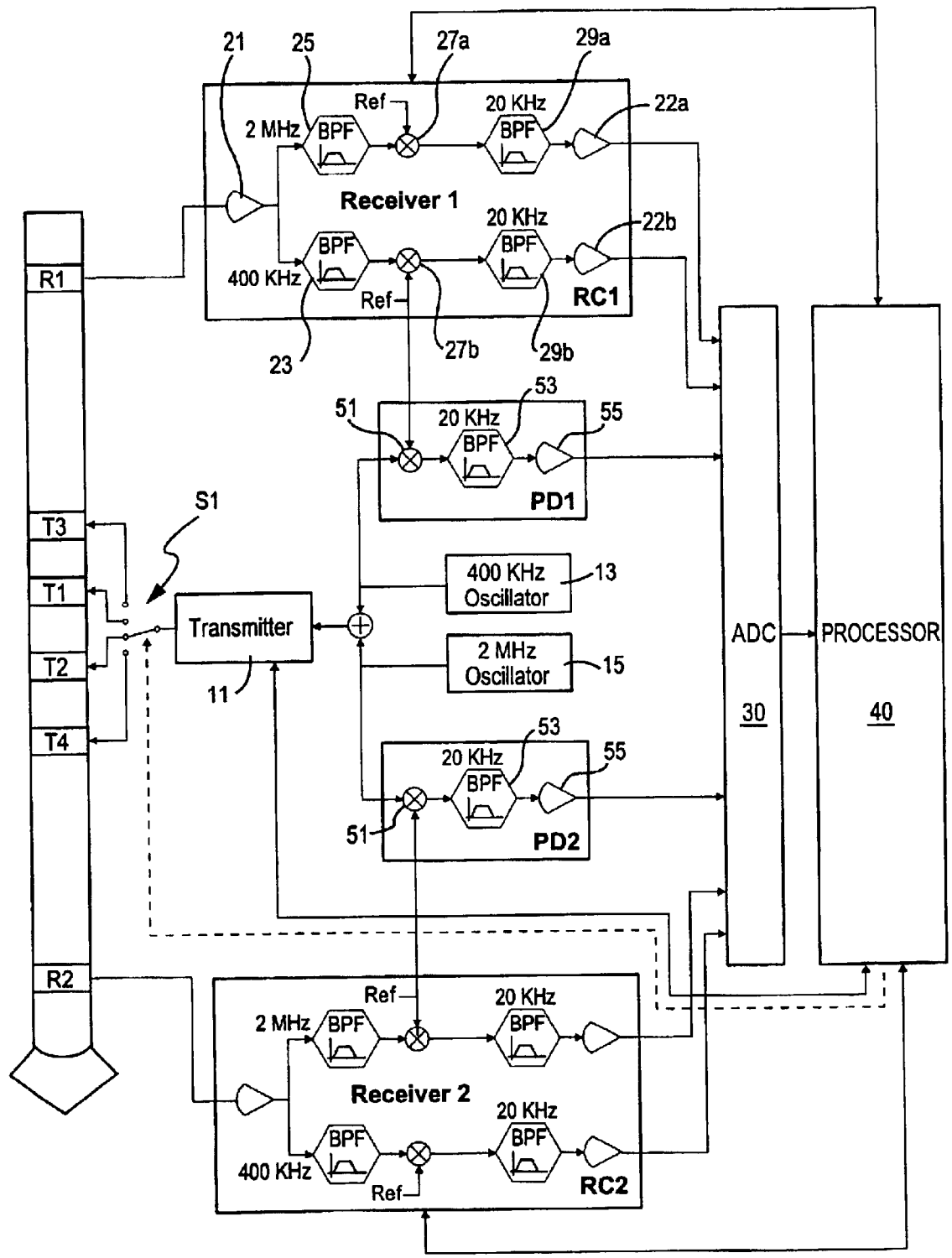
FIG. 19 is a diagram, partially in block form, illustrating the well logging device of FIG. 2D and its associated electronics which enables simultaneous transmission of an electromagnetic wave signal having more than one frequency from the same transmitting antenna.

Referring now to FIG. 19, another exemplary embodiment of a well logging device in accordance with the present invention includes the antenna configuration illustrated in FIG. 2D and the implementation of a dual frequency transmitter. The receiving antennas R1, R2, receivers RC1 and RC2, ADC 30 and processor 40 are identical to those described in connection with the exemplary embodiment of FIG. 4 and are thus capable of detecting, processing, digitally converting and storing data received by receiving antennas R1, R2 in the manner discussed in connection with the exemplary embodiment of FIG. 4.

In operation, each transmission from one of the four transmitting antennas T1–T4 simultaneously contains a plurality of frequency components (e.g., 400 KHz and 2 MHz) for detection and processing by receiving antennas R1, R2 and receivers RC1, RC2. In particular, transmitting antenna T1 can first transmit an electromagnetic wave simultaneously containing 400 KHz and 2 MHz frequency components for detection by the receiving antennas R1 and R2. Switch S1 may then be flipped to connect transmitting antenna T2 to transmitter 11 so that an electromagnetic wave simultaneously containing 400 KHz and 2 MHz frequency components is transmitted from transmitting antenna T2, detected by receiving antennas R1 and R2 and then processed, digitally converted and stored. Switch S1 is then flipped to connect transmitting antenna T3 to transmitter 11. Transmitting antenna T3 transmits an electromagnetic wave simultaneously containing 400 KHz and 2 MHz frequency components for detection and processing by receiving antennas R1 and R2 and receivers RC1 and RC2. Finally, switch S1 is then flipped to connect transmitting antenna T4 to transmitter 11 so that an electromagnetic waves is transmitted from transmitting antenna T4 simultaneously having 400 KHz and 2 MHz frequency components. An electromagnetic wave transmitted from transmitting antenna T4 is detected by receiving antennas R1, R2, processed by receivers RC1, RC2, digital converted by ADC 30 and stored by processor 40. Processor 40 can then calculate the phase shift and/or amplitude ratio measurements between two or more of the 400 KHz signal components detected by each receiving antenna R1 and R2, and the phase shift and/or amplitude ratio between two or more 2 MHz signal components detected by each receiving antenna R1 and R2. Based upon these amplitude ratio and/or phase shift measurements, processor 40 may determine a compensated measurement of formation resistivity at two or more radial depths of investigation at a measuring point between the upper transmitting antennas T1, T3 and the lower transmitting antennas T2, T4.

As will be appreciated by those skilled in the art, each of the exemplary embodiments of FIGS. 18–19 may be modified by adding additional receiving antennas (receiving antennas R3–R4) as illustrated in FIG. 2E. Corresponding receivers and/or switches may be connected to the additional receiving antennas R3 and R4 as illustrated in the exemplary embodiments of FIGS. 6–11. Even further receiving antennas (receiving antennas R5 and R6) may also be added along with corresponding receiving circuitry as illustrated in FIGS. 12–17.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the above exemplary embodiments discuss digital signal processing in order to perform calculations (e.g., calculations for phase shift and/or amplitude ratio), analog signal processing could be utilized instead to perform necessary calculations.

What is claimed is:

1. An apparatus for determining resistivity of a formation surrounding a borehole, the apparatus comprising:
    a housing having a longitudinal axis;
    first and second transmitting antennas affixed to the housing for transmitting electromagnetic waves into the formation;
    a first untuned receiving antenna for detecting the electromagnetic waves, the first untuned receiving antenna being affixed to the housing at a position along the longitudinal axis of the housing above the first and second transmitting antennas;
    a second untuned receiving antenna for detecting the electromagnetic waves, the second untuned receiving antenna being affixed to the housing at a position along the longitudinal axis of the housing below the first and second transmitting antennas; and
    a processor operatively coupled to the first and second untuned receiving antennas for determining the resistivity of the formation based on the electromagnetic waves detected by the first and second untuned receiving antennas.

2. The apparatus of claim 1 further comprising a drill bit arranged proximately to one end of the housing.

3. The apparatus of claim 1 wherein the processor determines the resistivity of the formation by determining at least one of a phase shift and an amplitude ratio between the electromagnetic waves detected by the first untuned receiving antenna and determining at least one of a phase shift and an amplitude ratio between the electromagnetic waves detected by the second untuned receiving antenna.

4. The apparatus of claim 1 wherein the first and second transmitting antennas are alternately connected to a transmitter, the transmitter energizing the transmitting antenna that is connected to the transmitter with a signal having one of a plurality of available frequencies.

5. The apparatus of claim 1 wherein the first and second transmitting antennas are alternately connected to a transmitter, the transmitter energizing the one of the first and second transmitting antennas that is connected to the transmitter with a signal that simultaneously includes a plurality of frequency components.

6. The apparatus of claim 1 wherein the first and second transmitting antennas are respectively connected to first and second transmitters, the first transmitter energizing the first transmitting antenna so that the electromagnetic wave transmitted by the first transmitting antenna has a first frequency and the second transmitter energizing the second transmitting antenna so that the electromagnetic wave transmitted by the second transmitting antenna has a second frequency different than the first frequency, the electromagnetic wave transmitted by the first transmitting antenna and the electromagnetic wave transmitted by the second transmitting antenna being transmitted simultaneously.

7. A method of determining resistivity of a formation surrounding a borehole, the method comprising:
    transmitting a first electromagnetic wave through the formation from a first transmitting antenna;
    detecting the first electromagnetic waves transmitted through the formation in a first untuned receiving antenna and a second untuned receiving antenna, the first untuned receiving antenna being longitudinally located at a position above the first transmitting antenna and the second untuned receiving antenna being longitudinally located at a position below the first transmitting antenna;

transmitting a second electromagnetic wave through the formation from a second transmitting antenna, the second transmitting antenna being longitudinally located at a different position than the first transmitting antenna;

detecting the second electromagnetic wave transmitted through the formation from the second transmitting antenna in the first untuned receiving antenna and the second untuned receiving antenna, the first untuned receiving antenna being longitudinally located at a position above the second transmitting antenna and the second untuned receiving antenna being longitudinally located at a position below the second transmitting antenna; and determining a resistivity based on the first and second electromagnetic waves detected by the first untuned receiving antenna and the first and second electromagnetic waves detected by the second untuned receiving antenna.

8. The method of claim 7 wherein transmission of the first and second electromagnetic waves by the first and second transmitting antennas, respectively, and detection of the first and second electromagnetic waves by each of the first and second untuned receiving antennas are accomplished while the borehole is being drilled.

9. The method of claim 7 wherein determining the resistivity of the formation includes determining at least one of phase shift and amplitude ratio between the first and second electromagnetic waves detected by the first untuned receiving antenna and determining at least one of phase shift and amplitude ratio between the first and second signals of the electromagnetic energy detected by the second untuned receiving antenna.

10. The method of claim 7 wherein the first and second electromagnetic waves are generated by respectively energizing the first and second transmitting antennas with a signal having a frequency selected from a plurality of available frequencies.

11. The method of claim 10 wherein selecting from a plurality of available frequencies includes alternately connecting the first and second transmitting antennas with one of a plurality of available oscillators, each of the oscillators providing a signal having a different frequency than that provided by the other oscillator(s).

12. The method of claim 7 wherein the first electromagnetic wave simultaneously includes first and second frequency components and the second electromagnetic wave also simultaneously includes the first and second frequency components.

13. The method of claim 7 wherein the first and second electromagnetic waves are transmitted simultaneously at first and second frequencies, respectively, the first and second frequencies being different than each other.

14. An apparatus for determining resistivity of a formation surrounding a borehole, the apparatus comprising:

a housing having a longitudinal axis;

first and second transmitting antennas affixed to the housing for respectively transmitting first and second electromagnetic waves through the formation;

a first untuned receiving antenna for detecting the first and second electromagnetic waves transmitted through the formation, the first untuned receiving antenna being affixed to the housing at a position along the longitudinal axis of the housing above the first and second transmitting antennas;

a second untuned receiving antenna for detecting the first and second electromagnetic waves transmitted through the formation, the second untuned receiving antenna being affixed to the housing at a position along the longitudinal axis of the housing below the first and second transmitting antennas;

a third untuned receiving antenna for detecting the first and second electromagnetic waves transmitted through the formation, the third untuned receiving antenna being affixed to the housing at a position along the longitudinal axis of the housing above the first and second transmitting antennas;

a fourth untuned receiving antenna for detecting the first and second electromagnetic waves transmitted through the formation, the fourth untuned receiving antenna being affixed to the housing at a position along the longitudinal axis of the housing below the first and second transmitting antennas; and a processor operatively coupled to the first, second, third and fourth untuned receiving antennas for determining the resistivity of the formation based on the electromagnetic waves detected by at least two of the first, second, third and fourth untuned receiving antennas.

15. The apparatus of claim 14 further comprising a drill bit arranged proximately to one end of the housing.

16. The apparatus of claim 14 wherein the processor determines the resistivity of the formation by determining at least two of the following: (i) a phase shift and/or an amplitude ratio between the electromagnetic waves detected by the first untuned receiving antenna, (ii) a phase shift and/or an amplitude ratio between the electromagnetic waves detected by the second untuned receiving antenna, (iii) a phase shift and and/or amplitude ratio between the electromagnetic waves detected by the third untuned receiving antenna, and (iv) a phase shift and/or amplitude ratio between the electromagnetic waves detected by the fourth untuned receiving antenna.

17. The apparatus of claim 14 wherein the first, second, third and fourth untuned receiving antennas are operatively coupled to the processor through first, second, third and fourth receivers.

18. The apparatus of claim 14 wherein the first and third receiving antennas are alternately connected to a first receiver through a first switch so that one of the first and third untuned receiving antennas is operatively coupled to the processor at a time and the second and fourth untuned receiving antennas are alternately connected to a second receiver through a second switch so that one of the second and fourth untuned receiving antennas is coupled to the processor at a time.

19. The apparatus of claim 14 wherein the first and second transmitting antennas are alternately connected to a transmitter, the transmitter energizing the one of the first and second transmitting antennas that is connected to the transmitter with a signal having one of a plurality of available frequencies.

20. The apparatus of claim 14 wherein the first and second transmitting antennas are alternately connected to a transmitter, the transmitter energizing the one of the first and second transmitting antennas that is connected to the transmitter with a signal that simultaneously includes a plurality of frequency components.

21. The apparatus of claim 14 wherein the first and second transmitting antennas are respectively connected to first and second transmitters, the first transmitter energizing the first transmitting antenna so that the first electromagnetic wave transmitted by the first transmitting antenna has a first frequency, and the second transmitter energizing the second transmitting antenna so that the second electromagnetic wave transmitted by the second transmitting antenna has a second frequency different than the first frequency.

22. The apparatus of claim 21 wherein the first electromagnetic wave transmitted by the first transmitting antenna and the second electromagnetic wave transmitted by the second transmitting antenna are transmitted simultaneously.

23. The apparatus of claim 14 further comprising:
a fifth untuned receiving antenna for detecting the first and second electromagnetic waves transmitted through the formation, the fifth untuned receiving antenna being affixed to the housing at a position along the longitudinal axis of the housing above the first and second transmitting antennas;
a sixth untuned receiving antenna for detecting the first and second electromagnetic waves transmitted through the formation, the sixth untuned receiving antenna being affixed to the housing at a position along the longitudinal axis of the housing below the first and second transmitting antennas; and
a processor operatively coupled to the first, second, third, fourth, fifth and sixth untuned receiving antennas for determining the resistivity of the formation based on the electromagnetic waves detected by at least two of the first, second, third fourth, fifth and sixth untuned receiving antennas.

24. The apparatus of claim 23 wherein the first, second, third, fourth, fifth and sixth untuned receiving antennas are operatively coupled to the processor through first, second, third, fourth, fifth and sixth receivers.

25. The apparatus of claim 23 wherein the first, third and fifth untuned receiving antennas are alternately connected to a first receiver through a first switch for alternately coupling one of the first, third and fifth untuned receiving antennas to the processor, and the second, fourth and sixth receivers are alternately connected to a second receiver through a second switch for alternately coupling one of the second, fourth and sixth untuned receiving antennas to the processor.

26. A method of determining resistivity of a formation surrounding a borehole, the method comprising:
transmitting a first electromagnetic wave through the formation from a first transmitting antenna;
detecting the first electromagnetic wave transmitted through the formation in four untuned receiving antennas, two of the four untuned receiving antennas being longitudinally located at respective positions above the first transmitting antenna and the other two of the four untuned receiving antennas being longitudinally located at respective positions below the first transmitting antenna;
transmitting a second electromagnetic wave through the formation from a second transmitting antenna, the second transmitting antenna being longitudinally located at a different position than the first transmitting antenna;
detecting the second electromagnetic wave transmitted through the formation in the four untuned receiving antennas, the two of the four untuned receiving antennas longitudinal located above the first transmitting antenna also being longitudinally located at respective positions above the second transmitting antenna and the other two of the four untuned receiving antennas longitudinally located below the first transmitting antenna also being longitudinally located at respective positions below the second transmitting antenna; and
determining the resistivity of the formation based on the first and second electromagnetic waves detected by at least two of the four untuned receiving antennas.

27. The method of claim 26 wherein transmission of the first and second electromagnetic waves by the first and second transmitting antennas, respectively, and detection of the first and second electromagnetic waves by the four untuned receiving antennas are accomplished while the borehole is being drilled.

28. The method of claim 26 wherein determining the resistivity of the formation includes determining at least two of the following: (i) a phase shift and/or an amplitude ratio between the first and second electromagnetic waves detected by a first one of the four untuned receiving antennas, (ii) a phase shift and/or an amplitude ratio between the first and second electromagnetic waves detected by a second one of the four untuned receiving antennas (iii) a phase shift and/or amplitude ratio between the first and second electromagnetic waves detected by a third one of the untuned receiving antennas, and (iv) a phase shift and/or amplitude ratio between the first and second electromagnetic waves detected by a fourth one of the untuned receiving antennas.

29. The method of claim 26 wherein the four untuned receiving antennas are respectively connected to first, second, third and fourth receivers.

30. The method of claim 26 wherein the two untuned receiving antennas longitudinally located above the first and second transmitting antennas are alternately connected to a first receiver and the other two untuned receiving antennas longitudinally located below the first and second transmitting antennas are alternately connected to a second receiver.

31. The method of claim 26 wherein the first and second electromagnetic waves are alternately generated by alternately energizing the first and second transmitting antennas with a signal having a frequency selected from a plurality of available frequencies.

32. The method of claim 31 wherein selecting from a plurality of available frequencies includes alternately connecting the first and second transmitting antennas with one of a plurality of available oscillators, each oscillator providing a signal having a different frequency than that provided by the other oscillator(s).

33. The method of claim 26 wherein the first electromagnetic wave simultaneously includes first and second frequency components and the second electromagnetic wave also simultaneously includes the first and second frequency components.

34. The method of claim 26 wherein the first and second electromagnetic waves are respectively transmitted by the first and second transmitting antennas simultaneously at first and second frequencies, the first and second frequencies being different than each other.

35. The method of claim 26 further comprising:
detecting the first electromagnetic wave transmitted through the formation in a fifth untuned receiving antenna and a sixth untuned receiving antenna, the fifth untuned receiving antenna being longitudinally located at a position above the first and second transmitting antennas and the sixth untuned receiving antenna being longitudinal located at a position below the first and second transmitting antennas;
detecting the second electromagnetic wave transmitted through the formation in the fifth and sixth untuned receiving antennas; and
determining a resistivity based on the first and second electromagnetic waves detected by at least two of the six untuned receiving antennas.

36. The method of claim 35 wherein each of the six untuned receiving antennas is respectively coupled to first, second, third, fourth, fifth and sixth receivers.

37. The method of claim 35 wherein the untuned receiving antennas longitudinally located above the first and second transmitting antennas are alternately connected to a first receiver through a first switch, and the untuned receiving antennas longitudinally located below the first and second transmitting antennas are alternately connected to a second receiver through a second switch.

38. An apparatus for determining resistivity of a formation surrounding a borehole, the apparatus comprising:

a housing having a longitudinal axis;

a first transmitting antenna affixed to the housing for transmitting a first electromagnetic wave through the formation;

a second transmitting antenna affixed to the housing for transmitting a second electromagnetic wave through the formation;

a third transmitting antenna affixed to the housing for transmitting a third electromagnetic wave through the formation;

a fourth transmitting antenna affixed to the housing for transmitting a fourth electromagnetic wave through the formation, each of the first, second, third and fourth transmitting antennas having a different longitudinal position along the longitudinal axis of the housing;

a first untuned receiving antenna for detecting the first, second, third and fourth electromagnetic waves, the first untuned receiving antenna being affixed to the housing at a position along the longitudinal axis of the housing above the first, second, third and fourth transmitting antennas;

a second untuned receiving antenna for detecting first, second, third and fourth electromagnetic waves, the second untuned receiving antenna being affixed to the housing at a position along the longitudinal axis of the housing below the first, second, third and fourth transmitting antennas; and a processor operatively coupled to the first and second untuned receiving antennas for determining the resistivity of the formation based on at least two of the electromagnetic waves detected by the first untuned receiving antenna and at least two of the electromagnetic waves detected by the second untuned receiving antenna.

39. The apparatus of claim 38 further comprising a drill bit arranged proximately to one end of the housing.

40. The apparatus of claim 38 wherein the processor determines the resistivity by determining a phase shift and an amplitude ratio between at least two of the electromagnetic waves detected by the first untuned receiving antenna and determining at least one of a phase shift and an amplitude ratio between at least two of the electromagnetic waves detected by the second untuned receiving antenna.

41. The apparatus of claim 38 wherein the first, second, third and fourth transmitting antennas are alternately connected to a transmitter, the transmitter energizing the transmitting antenna that is connected to the transmitter with a signal having one of a plurality of available frequencies.

42. The apparatus of claim 38 wherein the first, second, third and fourth transmitting antennas are alternately connected to a transmitter, the transmitter energizing the transmitting antenna that is connected to the transmitter with a signal that simultaneously includes a plurality of frequency components.

43. A method of determining resistivity of a formation surrounding a borehole, the method comprising:

transmitting first, second, third and fourth electromagnetic waves through the formation from first, second, third, and fourth transmitting antennas, respectively, each of the transmitting antennas being longitudinally located at a different position than each of the other transmitting antennas;

detecting the first, second, third and fourth electromagnetic waves transmitted through the formation in a first untuned receiving antenna and a second untuned receiving antenna, the first untuned receiving antenna being longitudinally located at a position above the first, second, third and fourth transmitting antennas and the second untuned receiving antenna being longitudinally located at a position below the first, second, third and fourth transmitting antennas; and determining a resistivity based on at least two of the first, second, third and fourth electromagnetic waves detected by the first untuned receiving antenna and at least two of the first, second, third and fourth electromagnetic waves detected by the second untuned receiving antenna.

44. The method of claim 43 wherein transmission of first, second, third and fourth electromagnetic waves by the first, second, third and fourth transmitting antennas, respectively, and detection of the electromagnetic waves by the first and second untuned receiving antennas are accomplished while the borehole is being drilled.

45. The method of claim 43 wherein determining the resistivity of the formation includes determining a phase shift and/or amplitude ratio between at least two of the first, second, third and fourth electromagnetic waves detected by the first untuned receiving antenna and determining a phase shift and/or amplitude ratio between at least two of the first, second, third and fourth electromagnetic waves detected by the second untuned receiving antenna.

46. The method of claim 43 wherein the first, second, third and fourth electromagnetic waves are generated by respectively energizing the first, second, third and fourth transmitting antennas with a signal having a frequency selected from a plurality of available frequencies.

47. The method of claim 46 wherein selecting from a plurality of available frequencies includes alternately connecting the one of the first, second, third and fourth transmitting antennas with one of a plurality of available oscillators, each oscillator providing a signal having a different frequency than that provided by the other oscillator(s).

48. The method of claim 43 wherein the first, second, third and fourth transmitted electromagnetic waves each simultaneously includes first and second frequency components.

* * * * *

UNITED STATES PATENT AND TRADEMARK OFFICE
CERTIFICATE OF CORRECTION

PATENT NO.    : 6,791,330 B2
DATED         : September 14, 2004
INVENTOR(S)   : McCormick It is certified that error appears in the above-identified patent and that said Letters Patent is hereby corrected as shown below:

Title page,
Item [75], Inventors, insert -- Douglass S. Byrd, Copley, OH (US) --

Signed and Sealed this

Fourteenth Day of December, 2004

JON W. DUDAS
*Director of the United States Patent and Trademark Office*